(12) United States Patent
Ohsaki et al.

(10) Patent No.: US 7,955,662 B2
(45) Date of Patent: Jun. 7, 2011

(54) OPTICAL MULTILAYER REFLECTIVE FILM, AND ALIGNED METAL PARTICLE FILM AND MANUFACTURING PROCESS THEREFOR

(75) Inventors: Hisashi Ohsaki, Tokyo (JP); Akihiro Matsubayashi, Ube (JP); Kikuo Ataka, Ube (JP); Kenji Fukunaga, Ichihara (JP); Tetsurou Tsuji, Ube (JP)

(73) Assignees: The University of Tokyo, Tokyo (JP); UBE Industries, Ltd., Yamaguchi (JP)

( * ) Notice: Subject to any disclaimer, the term of this patent is extended or adjusted under 35 U.S.C. 154(b) by 1113 days.

(21) Appl. No.: 11/725,732

(22) Filed: Mar. 20, 2007

(65) Prior Publication Data

US 2008/0081207 A1 Apr. 3, 2008

(30) Foreign Application Priority Data

Sep. 29, 2006 (JP) ................................. 2006-268911
Sep. 29, 2006 (JP) ................................. 2006-268912
Dec. 7, 2006 (JP) ................................. 2006-330579

(51) Int. Cl.
*B32B 5/16* (2006.01)
*B01J 19/08* (2006.01)

(52) U.S. Cl. ...................................................... 427/457

(58) Field of Classification Search .................. 156/155, 156/246, 272.2; 423/592.1, 23; 106/1.05, 106/1.13; 427/457, 553, 558, 581, 595, 597, 427/126.5, 126.6, 154, 162, 222; 264/437, 264/108, 212, 405, 165, 166, 204

See application file for complete search history.

(56) References Cited

U.S. PATENT DOCUMENTS

| 4,447,488 A * | 5/1984 | Simm et al. .................... 428/213 |
| 4,512,855 A | 4/1985 | Mazur |
| 5,661,042 A * | 8/1997 | Fang et al. ....................... 438/17 |
| 5,716,679 A * | 2/1998 | Krug et al. ..................... 427/515 |
| 5,900,098 A * | 5/1999 | Mueller et al. .............. 156/275.7 |
| 5,968,664 A * | 10/1999 | Heberger et al. .............. 428/463 |
| 6,149,857 A * | 11/2000 | McArdle et al. ............... 264/429 |
| 6,712,997 B2 * | 3/2004 | Won et al. ...................... 252/503 |
| 6,798,072 B2 * | 9/2004 | Kajiwara et al. .............. 257/778 |
| 2005/0119390 A1 * | 6/2005 | Gaddy et al. .................. 524/440 |

FOREIGN PATENT DOCUMENTS

JP 05-346496 12/1993

(Continued)

OTHER PUBLICATIONS

International Preliminary Report on Patentability for PCT/JP2007/056987 dated Mar. 31, 2009.

(Continued)

*Primary Examiner* — Richard Crispino
*Assistant Examiner* — Daniel McNally
(74) *Attorney, Agent, or Firm* — Knobbe Martens Olson & Bear LLP

(57) ABSTRACT

An aligned metal-particle film, in which metal particles are aligned in a polymer as a layer with a certain interval in parallel with a substrate is disclosed. The aligned metal-particle film is manufactured by forming a polymer film containing a metal component on a reflecting substrate; and irradiating the polymer film with light at a particular wavelength, whereby metal particles are aligned in parallel with the substrate in the polymer.

13 Claims, 27 Drawing Sheets

FOREIGN PATENT DOCUMENTS

| | | |
|---|---|---|
| JP | 06-174906 | 6/1994 |
| JP | 08-122498 | 5/1996 |
| JP | 09-113697 | 5/1997 |
| JP | 2000-089010 | 3/2000 |
| WO | WO 2005/054819 A1 | 6/2005 |

OTHER PUBLICATIONS

Saito M, Imanishi y "Host-guest composites containing ultrasonically arranged particles", Journal of Materials Science, vol. 35, No. 10, pp. 2373-2377, May 15, 2000.

Saito M, Daian T, Hayashi K, Izumida S "Fabrication of a polymer composite with periodic structure by the use of ultrasonic waves" Journal of Applied Physics, vol. 83, No. 7, pp. 3490-3494, Apr. 1, 1998.

Shin Horiuchi and Takashi Fujita "Three-Dimensional Nanoscale Alignment of Metal Nanoparticles Using Block Copolymer Films as Nanoreactors" Langmuir 2003, vol. 19, pp. 2963-2973.

Shin Horiuchi, Muhammad I. Sarwar, and Yukimichi Nakao "Nanoscale Assembly of Metal Clusters in Block Copolymer Films with Vapor of a Metal-Acetylacetonato Complex Using a Dry Process", Advanced Materials, vol. 12, pp. 1507-1511, 2000.

Ward A. Lopes and Heinrich M. Jaeger "HIerarchical self-assembly of metal namostructures on diblock copolymer scaffolds", Letters to Nature, 414, pp. 735-738, 2001.

International Search Report for PCT/JP2007/056987 dated on Jul. 10, 2007.

Extended European Search Report for European Patent Application No. 07 74 0425 dated Mar. 15, 2010 by European Patent Office.

* cited by examiner

OPTICAL MULTILAYER REFLECTIVE FILM, AND ALIGNED METAL PARTICLE FILM AND MANUFACTURING PROCESS THEREFOR

BACKGROUND OF THE INVENTION

1. Field of the Invention

This invention relates to an optical multilayer reflective film having a feature that it selectively reflects light with a particular wavelength. Further, the present invention relates to a process for orderly aligning metal particles, and in particular relates to a process for aligning metal particles in a layer in a polymer film in parallel with the film.

2. Description of the Background Art

Optical communication has become essential as technique supporting large-capacity communication as internet has been rapidly prevailed. Furthermore, prevalence of high-density multiple-wavelength communication has increased the number of wavelengths used, leading to drastic increase of the number of optical components used. Among these, optical elements employing a reflective/transmitting optical multilayer film with wavelength selectivity has become essential components.

Conventionally, multilayer dielectric optical films have been frequently used as a functional film controlling reflection properties at a particular wavelength of light. These dielectric multilayer films are generally composed of alternatively layered high-refractive-index layers and low-refractive-index layers which are optically substantially transparent at a particular wavelength on a substrate surface. Specifically, metal oxide and/or fluoride layers such as $Ta_2O_5$, $TiO_2$, $SiO_2$ and $MgF_2$ are formed in a multilayer structure so as to utilize interference between reflecting light and transmitted light in their interface, whereby optical properties such as transmission and reflection is achieved.

However, for preparing a multilayer dielectric optical film having such properties, it is necessary to, after selecting materials to be used and determining a layer structure with multiple layers, conduct film deposition while highly precisely controlling a thickness and a refractive index of each layer. In particular, advanced film-deposition technique is required for preparing a reflecting film which can selectively reflect light with a significantly narrow half width, resulting in increase in manufacturing steps and tendency to a higher manufacturing cost.

Patent References 1 to 4 have described a multilayer-film reflecting mirror having layered metal films, which is a reflecting mirror for a wavelength within in a X-ray range and additionally is a layered of high-and low-refractive-index layers to a wavelength within in a X-ray range. The principle is the same as that in the above-mentioned optical dielectric multilayer film.

With respect to organic/inorganic composite materials, there have been many studies on them. Organic/inorganic composite materials in which inorganic materials are complexed with organic polymers have been intensely developed because they allow for modification of functional properties of a polymer. Among others, studies have been intensely conducted, on a process for dispersing metal particles in a polymer with a certain regularity. For example, there has been described that a metal complex as a precursor for metal particles is sublimed and becomes contact with a block copolymer having different abilities of metal reduction under nitrogen, whereby the complex is selectively reduced only in one phase to achieve nano-level alignment of metal particles (see, for example, Non-patent Reference Nos. 1 to 3).

However, in terms of reported metal particle alignment in the polymer, distribution of each polymer in a co-polymer (alignment style) is determined in a self-organized manner, and there have been no reports in which metal particle alignment is completely controlled. In particular, there are no known methods for aligning metal particles in a layer in a polymer film in parallel with the film.

LIST OF REFERENCES

Patent Reference 1: Japanese published unexamined application 1993-346496;
Patent Reference 2: Japanese published unexamined application 1996-122498;
Patent Reference 3: Japanese published unexamined application 1997-113697;
Patent Reference 4: Japanese published unexamined application 2000-89010.
Non-patent Reference No. 1: Langmuir, Vol. 19, p. 2963 (2003);
Non-patent Reference No. 2: Advanced Materials, Vol. 12, p. 1507 (2000);
Non-patent Reference No. 3: Nature, 414, p. 735 (2001).

SUMMARY OF THE INVENTION

An objective of an aspect of the present invention is to provide an optical multilayer film with a simple structure which can selectively reflect light with a given wavelength.

An objective of another aspect of the present invention is to provide a process for preparing a novel aligned metal particle film by a convenient method. Further, another objective according to another aspect of this invention is to provide a novel aligned metal particle film.

Broadly the present invention relates to optical multilayer reflective film and aligned metal particle film. First, with respect to the optical multilayer reflective film as one of the main aspect of the present, the present application discloses the following items.

An optical multilayer reflective film comprising a periodic alternate layered structure consisting of transparent film layers which are substantially transparent to light at a wavelength $\lambda$ and metal layers, wherein the film selectively reflects the light at a wavelength $\lambda$.

In the above optical multilayer reflective film, at least some of repeating distances d between adjacent metal layers substantially have an optical length meeting the following equation:

$$d=\lambda/2.$$

In the above optical multilayer reflective film(s), all of repeating distances d between adjacent metal layers substantially have an optical length meeting the following equation:

$$d=\lambda/2.$$

In the above optical multilayer reflective film(s), the metal layer is a metal film or condensed metal particle layer. The above optical multilayer reflective film(s) reflect(s) 50% or more of the light at a wavelength $\lambda$.

In the above optical multilayer reflective film(s), the number of the metal layers is at least 15. In the above optical multilayer reflective film(s), the outermost layer in the atmosphere side is the transparent film layer.

In the above optical multilayer reflective film(s), the metal layer comprises, as a main component, at least one selected from the group consisting of silver, gold, aluminum, silicon, titanium, chromium, iron, cobalt, nickel, copper, zinc, germanium, zirconium, niobium, molybdenum, palladium, tin, antimony, tantalum, tungsten, platinum, bismuth and stainless steel.

In the above optical multilayer reflective film(s), a geometric film thickness of the metal layer is 0.5 to 15 nm. In the above optical multilayer reflective film(s), a geometric film thickness of the transparent film layer is 100 to 500 nm. In the above optical multilayer reflective film(s), the wavelength $\lambda$ is within a wavelength range from ultraviolet to near-infrared light.

The above optical multilayer reflective film(s), selectively reflect(s) light selected from the group consisting of i line from a mercury lamp ($\lambda$=365 nm), blue light ($\lambda$=460 nm), green light ($\lambda$=530 nm) and red light ($\lambda$=680 nm).

In the above optical multilayer reflective film(s), an optical film thickness d of the transparent film layer between the metal layers is within ±15% centering $\lambda/2$. In the above optical multilayer reflective film(s), a refractive index of the transparent film layer is 1.2 to 4.0.

According to this aspect of the present invention, there can be provided an optical multilayer film with a simple structure which selectively reflects a given wavelength. That is, in this invention, a layer configuration can be easily designed and there is larger freedom in selecting materials used. Thus, a manufacturing process can be so simplified that a manufacturing cost can be reduced in comparison with a conventional multilayer reflective film exhibiting wavelength selectivity.

Particularly, an optical multilayer film of the present invention is suitably used as a reflective film selectively reflecting a particular wavelength within a range from ultraviolet to near-infrared light.

In addition, the polymer/metal layered-structure, which is an embodiment of the present invention, allows for weight reduction and improvement in transportability, impact resistance and mechanical flexibility.

Further, with respect to the aligned metal particle film as one of the main aspect of the present, the present application discloses the following items.

A process for manufacturing an aligned metal particle film, comprising: Step (A) of forming a polymer film containing a metal component on a reflecting substrate; and Step (B) of irradiating the polymer film with light at a particular wavelength.

In the above manufacturing process, the aligned metal particle film has a multilayer structure in which dense metal-particle layers are periodically aligned in a thickness direction of the polymer film.

In the above manufacturing process(es), Step (A) of forming the polymer film comprises the sub-steps of forming a film with use of a polymer solution containing a metal component on the reflecting substrate; and evaporating a solvent.

The above manufacturing process(es) comprise(s): before Step (A), forming a release layer transmitting light at a wavelength used in the subsequent Step (B) on the reflecting substance; in Step (A), forming a polymer film containing a metal component on the release layer; and after Step (B), releasing the light-irradiated polymer film from the reflecting substrate.

In the above manufacturing process(es), the step of releasing the reflecting substrate from the polymer film comprises the step of removing the release layer. In the above manufacturing process(es), the release of the release layer is conducted by dissolving the release layer.

In the above manufacturing process(es), the metal component comprises a metal compound which is reduced by light at the particular wavelength to generate metal particles. In the above manufacturing process(es), the metal component comprises metal particles.

In the above manufacturing process(es), the metal compound is at least one selected from the group consisting of silver perchlorate, silver nitrate and chloroauric acid. In the above manufacturing process(es), the polymer constituting the polymer film is transparent at least at the particular wavelength.

In the above manufacturing process(es), the polymer is at least one selected from the group consisting of polymethacrylic acid, polyacrylic acid, a copolymer comprising a methacrylic or acrylic monomer unit and polyvinyl alcohol.

In the above manufacturing process(es), in Step (B), a wavelength of the irradiating light is varied to adjust a repeating distance of the metal particle layer in the aligned metal particle film.

In the above manufacturing process(es), in Step (B), an angle of the irradiating light to the reflecting substrate is varied to adjust a repeating distance of the metal particle layer in the aligned metal particle film.

An aligned metal particle film having a multilayer structure in which in a polymer film, dense metal-particle layers are periodically aligned in a thickness direction.

An aligned metal particle film prepared by the above process(es), having a multilayer structure in which in a polymer film, dense metal-particle layers are periodically aligned in a thickness direction.

A process for manufacturing a multilayer laminate including aligned metal particle films, said process comprising steps of manufacturing aligned metal particle film by the above process(es), and laminating plurality of the aligned metal particle films.

A multilayer laminate having a multilayer structure in which in a polymer film, dense metal-particle layers are periodically aligned in a thickness direction and manufactured by the above process.

A reflective film exhibiting wavelength selectivity comprising the above aligned metal particle film(s), or the above multilayer laminate.

According to this aspect of the present invention, a novel aligned metal particle film having a structure in which multiple metal particle layers are periodically aligned is prepared by a simple and convenient process. The obtained aligned metal particle film can be used in various applications because it is lightweight and excellent in transportability, impact resistance and mechanical flexibility. Furthermore, since it can selectively reflect light at a particular wavelength, it can be used as a reflective film in various applications such as an optical element and an optical component.

DETAILED DESCRIPTION OF THE INVENTION

<-Part A->

Figure 1:
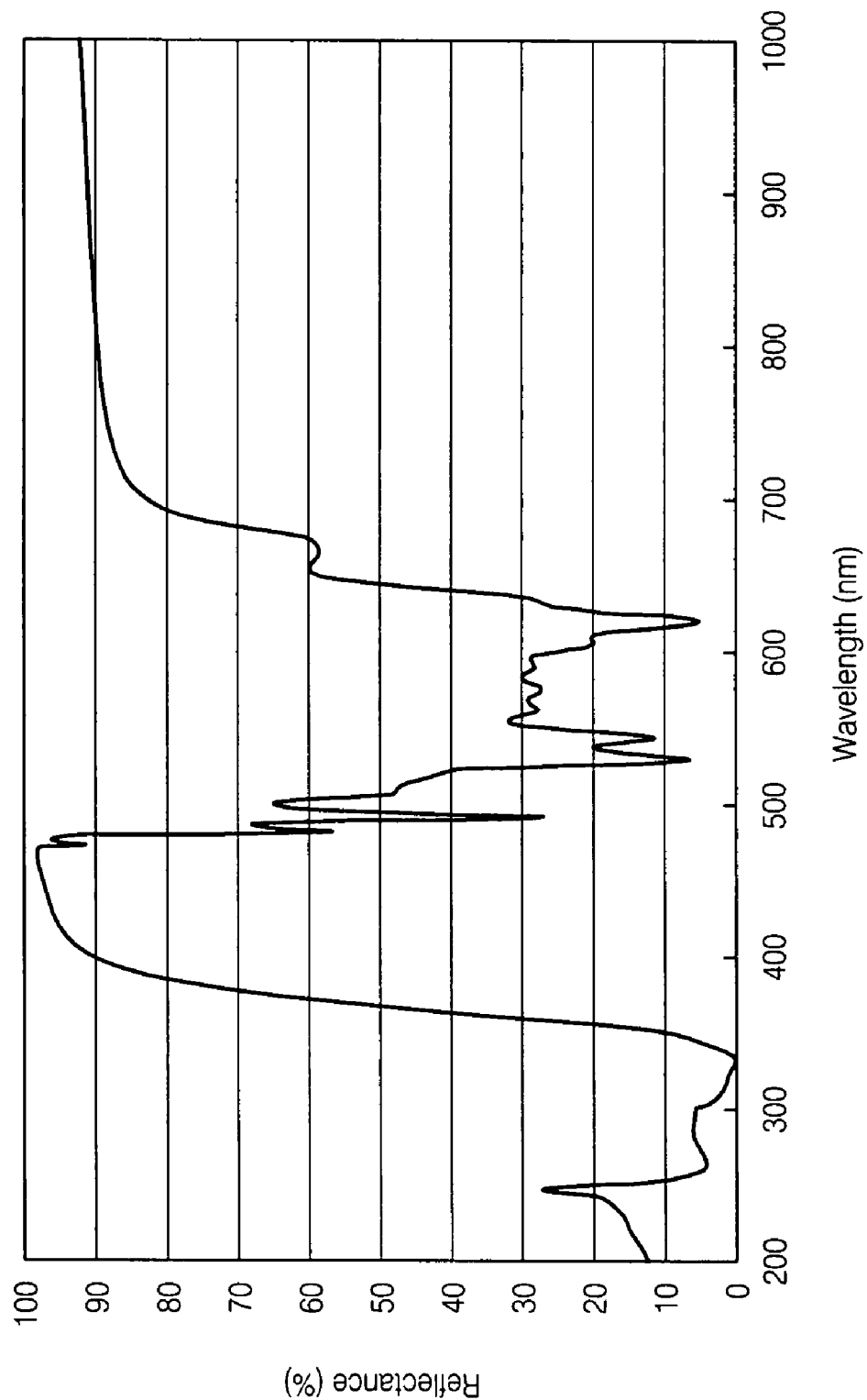
FIG. 1 shows expected optical properties obtained by an optical film designing software, Essential Macleod, in Reference Example A-1.

First, there will be detailed optical multilayer reflective film, which is the first main aspect of the present invention. An optical multilayer reflective film of this invention has a periodic alternate layered structure consisting of transparent film layers and metal layers, and selectively reflects a wavelength $\lambda$ meeting the optical conditions of the periodic structure. The term, "selectively" as used herein means that a reflection spectrum by a reflective film has a maximum in a reflection peak at a wavelength $\lambda$. A maximum in a reflection peak is preferably 40% or more, more preferably 50% or more. A narrower half width means better selectivity, and it is preferably 300 nm or less, more preferably 200 nm or less, particularly preferably 150 nm or less.

In the present invention, it is possible to obtain a desired wavelength as a wavelength $\lambda$ of a reflected light by selecting the conditions for a layer-structure of transparent film layers and metal layers constituting a multilayer reflective film. First, a transparent film layer is substantially transparent to light at a wavelength $\lambda$. The term, "substantially transparent" as used herein means that a transmittance is about 50% or more when the total film thickness of the multilayer reflective film is formed by a transparent film layer. In terms of transparency, a more transparent film is better, but a film can be used in a certain applications as long as it exhibits a transmittance of 50% or more when multilayer reflective film is formed only by the transparent film layer. The transparency is preferably 70% or more, more preferably 80% or more, particularly preferably 90% or more.

In general, one metal layer acts as a semi-transmissive and semi-reflective film, which reflects some of an incident light while transmitting some of the light. It is not necessary that one metal layer itself exhibits wavelength selectivity. Generally, it is preferable that light absorption is as small as possible, but light may be absorbed at a wavelength other than reflection wavelength $\lambda$. A reflectance and wavelength selectivity at a wavelength $\lambda$ can be controlled by adjusting the number of the metal layers in the multilayer structure as well as a reflectance and a transmittance in one metal layer.

The number of the metal layers is 2 or more, generally 5 or more, preferably 15 or more, further preferably 20 or more. In general, a larger layer number may improve wavelength selectivity and results in a narrower wavelength half width, but in the light of influence of absorption by the materials for the metal layer and/or the transparent film layers, the number of the metal layers is, in practice, preferably 300 or less, more preferably 200 or less, particularly preferably 100 or less.

For adjusting a wavelength of reflected light to a desired wavelength $\lambda$, it is necessary that at least some of repeating distances d between adjacent metal layers have an optical length substantially meeting the equation:

$$d = \lambda/2.$$

A repeating distance is a distance between an incident-light side surface of a metal film and the incident-light side surface of an adjacent metal film in case that each metal film is formed of a continuous metal layer, while, when each metal layer is formed of a condensed metal particle layer in a high density (hereinafter, referred to as a "high-density layer"), being a distance between the center of a high-density layer and the center of an adjacent high-density layer.

Herein, a metal film is very thin in comparison with a transparent film layer and in a high-density metal particle layer, particles are dispersed in the transparent film layer. Hence, only a thickness of the transparent film layer is worth considered, for example. Then, $d'=\lambda/(2n)$ is given from the relation of $d=nd'$, where d' is a geometric length of a repeating distance and n is a refractive index of a transparent film layer. For example, when light selectively reflected by an optical multilayer reflective film has a wavelength of $\lambda=365$ nm and a refractive index of a transparent film layer at the wavelength is n=1.6, a geometric length of a transparent film layer between metal layers is calculated as $d'=365/(2\times1.6)=114$ (nm).

The phrase, "having an optical length substantially meeting the equation $d=\lambda/2$" as used herein, means that some deviation of d from $\lambda/2$ is allowed. Specifically, it is allowed that a repeating distance d between different metal layers is fluctuated within a range of ±20%, preferably ±15% from $\lambda/2$ as a center. In practice, there may be some variation in film thicknesses in individual layers in preparing an optical multilayer reflective film and some fluctuation in film thicknesses in individual layers may be deliberately provided. For example, when it is used in a particular application such as a display, reflection of R (red), G (green), B (blue) and so forth in a visible-light range may be needed. In such a case, such reflection properties are required that have a certain bandwidth centering a designed wavelength in the light of features in human visibility. In this case, it is effective that a repeating distance in metal layers (or an optical film thickness in a transparent film layer) is deliberately varied. In such a case, taking distribution of human visibility into account, an optical length in a repeating distance of metal layers can be varied within ±20% or about ±15% centering $\lambda/2$.

In addition, there may be layers in a multilayer structure, where a repeating distance d between adjacent metal layers does not meet $\lambda/2$. The layer, however, preferably has an optical length meeting the following equation:

$$d=m\lambda/2$$

wherein m is an integer of 2 to 5, preferably 2.

A proportion of repeating distances in metal layers meeting the equation $d=\lambda/2$ is preferably 50% or more, more preferably 70% or more, particularly preferably 90% or more, most preferably 100%, that is, all of the transparent film layers between metal layers meet the equation $d=\lambda/2$.

A metal layer may be, as described above, a continuous metal film or a condensed metal particle layer in a high density (high-density layer). When it is a metal film, it has a film thickness (geometric length) of generally 0.5 to 15 nm, preferably 1.5 to 10 nm, more preferably 2 to 5 nm. When a metal layer is a high-density metal particle layer, a requirement is periodic density distribution of metal particles. In a preferable layer structure, for example, about 50% or more of particles may be present in the above thickness (geometric length) range.

A metal layer preferably contains, as a main component, at least one selected from the group consisting of silver, gold, aluminum, silicon, titanium, chromium, iron, cobalt, nickel, copper, zinc, germanium, zirconium, niobium, molybdenum, palladium, tin, antimony, tantalum, tungsten, platinum, bismuth and stainless steel (SUS). The phrase, "containing, as a main component, at least one" as used herein means that elements other than these constituting elements may be contained in a range of less than 50 atm %. A metal layer may be made of one metal or an alloy of two or more.

A metal layer preferably contains silver and/or gold as a main component. In particular, preference is given to a silver layer in which silver atoms are closely placed or a layer in which silver particles form a high-density layer.

A transparent film layer has to be made of a material transparent at least at a reflection wavelength, and may be transparent in other wavelength range (ultraviolet to visible light). In particular, a material transparent in a visible light range is preferable. A refractive index is, for example, but not limited to, 1.2 to 4.0, preferably 1.2 to 2.2.

A material which can constitute a transparent film layer may be selected from various organic compounds (various polymers) and various inorganic compounds. Examples of such organic compounds include polycarbonates, polyesters such as polyethylene terephthalate, polybutylene terephthalate and polyethylene naphthalate; acrylic polymers such as polymethyl methacrylate; styrene resins such as methylstyrene resins, acrylonitrile-butadiene-styrene (ABS) resins and acrylonitrile-styrene (AS) resins; polyolefins such as polyethylene, polypropylene and polymethylpentene; polyethers such as polyoxetane; transparent polyamides such as Nylon® 6 and Nylon® 66; and various transparent polymers such as polystyrene, polyvinyl chloride, polyether sulfone, polysulfone, polyacrylate and cellulose triacetate, polyvinyl alcohol, polyacrylonitrile, cyclic polyolefins, acrylic resins, epoxy resins, cyclohexadiene polymers, amorphous polyester resins, transparent polyimides, transparent polyurethanes, transparent fluororesins, thermoplastic elastomers and polylactic acid. Copolymers and/or mixtures of these polymers may be used. Examples of such inorganic compounds include silica, quartz, glass, silicon nitride, titania, alumina, aluminum nitride, zinc oxide, germanium oxide, zirconium oxide, niobium oxide, molybdenum oxide, indium oxide, tin oxide, tantalum oxide, tungsten oxide, lead oxide, diamond, boron nitride, carbon nitride, aluminum oxynitride and silicon oxynitride.

A suitable organic transparent film layer is a material containing polyacrylic acid and/or polymethacrylic acid as main components (50% or more). Polyacrylic acid is particularly suitable. A suitable inorganic transparent layer is a material containing silica and quartz as main components (50% or more). Silica is particularly suitable.

A film thickness of a transparent film layer is adjusted as described above, and in a specific embodiment, is, for example, 100 to 500 nm, preferably 100 to 350 nm, more preferably 110 to 250 nm.

In an optical multilayer reflective film of the present invention, an outermost layer in contact with the atmosphere is preferably a transparent film layer because if the outermost layer in the atmosphere side is a metal layer, the metal is deteriorated due to oxidation. There are no particular restrictions to a film thickness of the transparent film layer as the outermost layer, but it may be adjusted such that an optical film thickness d is substantially $\lambda/4$.

In the present invention, a metal layer and a transparent film layer may be formed by any known process, depending on materials used; a metal layer and a transparent film layer made of an inorganic compound may be formed by, for example, vacuum deposition, sputtering, plasma CVD, thermal CVD or sol-gel process while a transparent film layer made of an organic compound may be formed by, for example, vacuum deposition, solution casting, spin coating or any of other various coating methods and various printing methods.

As described above, an optical multilayer reflective film can be designed and formed such that the relationship nd'=λ/2 is met, taking into account a refractive index of a transparent film layer at a wavelength of light to be selectively reflected, to provide reflective films exhibiting wavelength selectivity in various wavelength ranges.

As a specific example, when a wavelength of light selectively reflected by an optical multilayer reflective film is λ=365 nm, i line from a mercury lamp can be selectively reflected in the ultraviolet ray range. When a wavelength of light selectively reflected by an optical multilayer reflective film is λ=460 nm, blue light can be selectively reflected in the visible-light range. When a wavelength of light selectively reflected by an optical multilayer reflective film is λ=530 nm, green light can be selectively reflected in the visible-light range. Furthermore, when a wavelength of light selectively reflected by an optical multilayer reflective film is λ=680 nm, there may be provided an optical multilayer reflective film capable of selectively reflecting red light in the visible-light range.

An optical multilayer reflective film of this invention can be used as an optical component in various forms in a variety of applications. Structurally, an optical multilayer reflective film can be used alone if the optical multilayer reflective film itself is self-supporting. An optical multilayer reflective film may be present on a substrate by lamination or film formation, where the substrate may be the substrate used for forming a multilayer film. The substrate may be transparent or opaque, depending on an application.

<-Part B->

Next, there will be detailed aligned metal particle film, the manufacturing process and use application, which is the second main aspect of the present invention. In a manufacturing process of this invention, a polymer film containing a metal component is formed on a reflecting substrate, followed by the irradiation of light at a particular wavelength λ. This invention will be described in detail.

Reflecting Substrate

There are no particular restrictions to a "reflecting substrate" used herein as long as the surface of the substrate can reflect light at a particular wavelength λ. An example may be a reflecting mirror in which a monolayer or multilayer film is formed on a substrate surface using a material selected from, for example, various metals, such as aluminum and silver, and metal oxides. Among these, preferred is a mirror in which aluminum and silica are sequentially deposited on a glass substrate. It is because aluminum allows for forming a film stably exhibiting a high reflectance in a range from ultraviolet to visible light. A silica layer is effective in preventing oxidation of aluminum.

A thickness (film thickness) of aluminum in a reflecting substrate is, for example, 100 to 2000 nm, preferably 150 to 1000 nm, more preferably about 200 to 800 nm. A smaller thickness (film thickness) of silica is preferred in order not to lower the reflection properties. Thus, it is for example, 5 to 100 nm, preferably 10 to 50 nm, more preferably about 10 to 30 nm.

Deposition of a Polymer Film Containing a Metal Component

A "polymer film containing a metal component" contains a metal component in a polymer and there may be contained one or two or more of metal elements. The metal component preferably contains at least one of a metal compound (including a complex and a salt, which is also true below) and metal particles. Generally, preferred is applying a polymer solution containing a metal compound and/or metal particles to a reflecting substrate, particularly applying a polymer solution containing a metal compound to a reflecting substrate.

A metal compound used in this invention forms metal particles by irradiation of light at a particular wavelength λ. Known examples of such a material are compounds which absorb light energy and then generate metal particles (or a metal constituting metal particles) by reduction (that is, a metal compound in which the metal element has a positive oxidation number). In many cases, the metal compounds are metal salts.

Examples of such a metal compound include metal oxides, metal hydroxides, metal halides (for example, metal chlorides) and metal acid salts {for example, metal inorganic acid salts (sulfates, nitrates, phosphates, oxoacid salts such as perchlorates and hydrochlorides) and metal organic acid salts (for example, acetates)}. The form of the metal salt may be a simple salt, a double salt or a complex salt (electrolyte or non-electrolyte complex, generally electrolyte complex) or a multimer (for example, dimer). A metal compound (metal salt) may be, for example, a compound containing an acid component {for example, hydrogen chloride (HCl)}, a basic component (for example, ammonia) and/or water ($H_2O$) (for example, a compound containing a hydrogen halide, a hydrated compound and a hydrate). Metal compounds may be used alone or in combination of two or more.

There are no particular restrictions to a metal element constituting the metal compound. A metal element constituting the metal compound is preferably a metal in Groups 8 to 11 in the periodic table (that is, iron, ruthenium, osmium, rhodium, iridium, nickel, palladium, platinum, copper, silver, gold and so on), particularly preferably a noble metal (for example, silver, gold, platinum and ruthenium) in particular embodiments. In the metal compound, these metal elements may be contained alone or in combination of two or more.

Specific examples of the metal compound (including metal salts) include compounds of metals in Groups 8 to 11 in the periodic table. Examples of salts of an acid of a metal in Groups 8 to 11 in the periodic table include inorganic salts, for example, inorganic salts of a noble metal such as silver perchlorate ($AgClO_4$) and silver nitrate ($AgNO_3$), and organic acid salts, for example, organic salts of a noble metal such as palladium acetate (for example, $Pd(CH_3CO_2)_2$) and ruthenium acetate (for example, $[Rh(CH_3CO_2)_2]_2$). Examples of a halide of a metal in Groups 8 to 11 in the periodic table include noble metal halides, for example, noble metal halides such as silver chloride (AgCl), gold chloride ($AuCl_3$), platinum chlorides (including $PtCl_2$ and $PtCl_4$) and palladium chlorides (including $PdCl_2$; metal halides containing an acidic moiety, for example, a hydrogen chloride-noble metal acid halide including a noble metal acid halide such as chloroauric acid (for example, $HAuCl_4$) and chloroplatinic acid (for example, $H_2PtCl_6$); and the hydrates of the above mentioned compounds.

Representative metal compounds will be listed, for gold, silver, copper, platinum, palladium and rhodium among Group 11 metals in the periodic table.

Examples of a gold compound include inorganic salts such as gold halides (for example, AuCl, $AuCl_3$, $AuBr_3$, AuI, $AuI_3$, $AuCl(PPh_3)$ and $AuCl(SC_4H_8)$), haloauric acids or their salts (for example, $HAuCl_4$, $HAuCl_4.4H_2O$, $NaAuCl_4.4H_2O$ and $KAuCl_4.4H_2O$), gold hydroxide (AuOH), gold cyanide (AuCN), gold oxides (for example, $Au_2O_3$) and gold sulfides ($Au_2S$ and $Au_2S_3$(III)); and various gold complexes such as trimethylgold(III) ($Au_2(CH_3)_6$), methyl(triphenylphosphine)gold(I) ($Au_2CH_3(PPh_3)$), 4-ethylbenzenethiolatogold(I)

(Au{S(C$_6$H$_4$)C$_2$H$_5$}), {μ-1,8-bis(diphenylphosphino)-3,6-dioxaoctane}bis{chlorogold(I)}((AuCl)$_2$(μ-{Ph$_2$P(CH$_2$)$_2$O(CH$_2$)$_2$O(CH$_2$)$_2$PPh}), (pentafluorophenyl)(tetrahydrothiophene)gold(I) (Au(C$_6$F$_5$)(SC$_4$H$_8$)) and tris(pentafluorophenyl)(tetrahydrothiophene)gold(III) (Au(C$_6$F$_5$)$_3$(SC$_4$H$_8$)).

Examples of a silver compound include inorganic salts {for example, silver halides such as AgF, AgCl, AgI and AgBr; silver oxides such as Ag$_2$O; and inorganic acid salts such as Ag$_2$SO$_4$, AgS, AgCN, AgClO$_4$, Ag$_3$PO$_4$, AgSCN, AgNO$_3$, Ag$_2$SO$_3$, Ag$_2$CO$_3$, Ag$_2$CrO$_4$, Ag$_2$Se, AgReO$_4$, AgBF$_4$, AgW$_4$O$_{16}$, Ag$_3$AsO$_4$, AgSbF$_6$, AgPF$_6$, AgHF$_2$, AgIO$_3$, AgBrO$_3$, AgOCN, AgMnO$_4$ and AgVO$_3$} and organic salts (or complexes) {for example, carboxylates such as C$_6$H$_5$CO$_2$Ag, C$_6$H$_{11}$(CH$_2$)$_3$CO$_2$Ag, CH$_3$CH(OH)CO$_2$Ag, silver trifluoroacetate(CF$_3$CO$_2$Ag), C$_2$F$_5$CO$_2$Ag, C$_3$F$_7$CO$_2$Ag and AgO$_2$CCH$_2$C(OH)(CO$_2$Ag)CH$_2$CO$_2$Ag; sulfonates such as silver p-toluenesulfonate and silver trifluoromethanesulfonate (CF$_3$SO$_3$Ag); (CH$_3$COCH=C(O—)CH$_3$)Ag; (C$_2$H$_5$)$_2$NCS$_2$Ag; phenylsilver(I); tetramesityltetrasilver(I); silver butylacetylide(I); chloro(isocyanocyclohexane)silver; (cyclopentadienyl)triphenylphosphinesilver(I); bispyridinesilver(I) perchlorate; (η$^4$-1,5-cyclooctadiene)(1,1,1,5,5,5-hexafluoro-2,4-pentadionato)silver(I); bromo(tri-n-butylphosphine)silver(I); bisimidazolesilver(I) nitrate; bis(1,10-phenanthroline)silver (I) perchlorate and nitrate; 1,4,8,11-tetraazacyclotetradecanesilver(II) perchlorate; and (1, 1, 1, 5,5,5-hexafluoro-2,4-pentanedionato)(N,N,N'-triethylethylenediamine)sil ver(I)}.

Examples of a copper compound include inorganic salts {for example, Cu$_2$O, CuO, Cu(OH)$_2$, copper halides such as CuF$_2$, CuCl, CuCl$_2$, CuBr, CuBr$_2$ and CuI; and inorganic acid salts such as CuCO$_3$, CuCN, Cu(NO$_3$)$_2$, Cu(ClO$_4$)$_2$, Cu$_2$P$_2$O$_7$, Cu$_2$Se, CuSe, CuSeO$_3$, CuSO$_4$, Cu$_2$S, CuS, Cu(BF$_4$)$_2$, Cu$_2$HgI$_4$, CuSCN, (CF$_3$CO$_2$)$_2$Cu, (CF$_3$SO$_3$)$_2$Cu, CuWO$_4$ and Cu$_2$(OH)PO$_4$}, and organic salts (or complexes) {for example, carboxylates such as copper(I) acetate, copper (II) acetate, [C$_6$H$_{11}$(CH$_2$)$_3$CO$_2$]$_2$Cu, [CH$_3$(CH$_2$)$_3$CH(C$_2$H$_5$)CO$_2$]$_2$Cu, (HCO$_2$)$_2$Cu and [HOCH$_2$[CH(OH)]$_4$CO$_2$]$_2$Cu, and (CH$_3$COCH=C(O—)CH$_3$)Cu, CH$_3$(CH$_2$)$_3$SCu, (CH$_3$O)$_2$Cu}.

Examples of a platinum compound include inorganic salts {for example, PtO$_2$; platinum halides such as PtCl$_2$, PtCl$_4$, PtBr$_2$, PtBr$_4$, PtI$_2$ and PtI$_5$; haloplatinic acids such as HPtCl$_6$.2H$_2$O; PtS$_2$; and Pt(CN)$_2$} and organic salts (or complexes){for example, (CH$_3$COCH=C(O—)CH$_3$)Pt and (C$_6$H$_5$CN)$_2$PtCl$_2$}.

Examples of a palladium compound include inorganic salts {for example, PdO; palladium halides such as PdCl$_2$, PdBr$_2$ and PdI$_2$; PdCN$_2$; Pd(NO$_3$)$_2$; PdS; PdSO$_4$; K$_2$Pd(S$_2$O$_3$)$_2$.H$_2$O; and chloropalladium acid}, and organic salts (or complexes){for example, carboxylates such as Pd(CH$_3$CO$_2$) palladium(II) propionate and (CF$_3$CO$_2$)$_2$Pd; (CH$_3$COCH=C(O—)CH$_3$)Pd and (C$_6$H$_5$CN)$_2$PdCl$_2$}.

Examples of a rhodium compound include inorganic salts {for example, Rh$_2$O$_3$; RhO$_3$; rhodium halides such as RhCl$_3$, RhBr$_3$ and RhI$_3$; RhPO$_4$; and Rh$_2$SO$_4$} and organic salts (or complexes){for example, carboxylates such as Rh(CH$_3$CO$_2$)$_2$, (CF$_3$CO$_2$)$_2$Rh, {[CH$_3$(CH$_2$)$_6$CO$_2$]$_2$Rh}$_2$, [(CF$_3$CF$_2$CF$_2$CO$_2$)$_2$Rh]$_2$ and {[(CH$_3$)$_3$CCO$_2$]$_2$Rh}$_2$; and (CH$_3$COCH=C(O—)CH$_3$)Rh}.

Among these metal compounds, particularly, silver salts are metal compounds which are highly photosensitive and very susceptible to photoreduction; suitable compounds are silver perchlorate and silver nitrate.

Preferable metal particles (in this context, "metal particle" means that contained in the polymer film during Step (A)) are those which can move in a film by irradiation with light at a particular wavelength λ; preferred are metal particles having a size of about 10 nm or less, particularly 2 nm or less such as colloidal particles. For example, preferred are metal particles precipitated from the above metal compound. For example, silver particles are preferable. Furthermore, a mixture of a metal compound and metal particles may be used.

A content of the metal component in the polymer is, depending on a molecular weight of the polymer, for example, about 0.5 to 500 parts by weight, preferably about 1 to 400 parts by weight, more preferably about 5 to 200 parts by weight to 100 parts by weight of the polymer.

The polymer is transparent at a particular wavelength λ and preferably selected from those capable of homogeneously dissolving or dispersing (particularly dissolving) a metal component. Furthermore, in one embodiment, preferred are those which can be homogeneously dissolved in an organic solvent.

Examples of such a polymer include polycarbonates, polyesters such as polyethylene terephthalate, polybutylene terephthalate and polyethylene naphthalate; acrylic polymers such as polymethyl methacrylate; styrene resins such as methylstyrene resins, acrylonitrile-butadiene-styrene (ABS) resins and acrylonitrile-styrene (AS) resins; polyolefins such as polyethylene, polypropylene and polymethylpentene; polyethers such as polyoxetane; transparent polyamides such as Nylon® 6 and Nylon® 66; and various transparent polymers such as polystyrene, polyvinyl chloride, polyether sulfone, polysulfone, polyacrylate and cellulose triacetate, polyvinyl alcohol, polyacrylonitrile, cyclic polyolefins, acrylic resins, epoxy resins, cyclohexadiene polymers, amorphous polyester resins, transparent polyimides, transparent polyurethanes, transparent fluororesins, thermoplastic elastomers and polylactic acid. Furthermore, a copolymer of a monomer as a component of the polymer and/or a mixture of these polymers may be used. Among these, polymers selected from polymethacrylic acid, polyacrylic acid, copolymers containing methacrylic or acrylic monomer unit, and polyvinyl alcohol are suitably used.

A solvent used may be generally those capable of dissolving or dispersing (particularly dissolving) a polymer and a metal component. Such a solvent can be appropriately selected, depending on the types of the polymer and the metal component; for example, water (which may be acidic, neutral or basic), alcohols (for example, alkyl alcohols such as methanol, ethanol, propanol, isopropanol, butanol and isobutanol), ethers (for example, straight chain ethers such as dimethyl ether and diethyl ether and cyclic ethers such as dioxane and tetrahydrofuran), esters (for example, acetates such as methyl acetate, ethyl acetate and butyl acetate), ketones (for example, dialkyl ketones such as acetone and ethyl methyl ketone), glycol ether esters (for example, ethyleneglycol monomethyl ether acetate, propyleneglycol monomethyl ether acetate, cellosolve acetate and butoxycarbitol acetate), cellosolves (for example, methyl cellosolve, ethyl cellosolve and butyl cellosolve), carbitols (for example, carbitol), halogenated hydrocarbons (for example, methylene chloride and chloroform), acetals (for example, acetal and methylal), amides (for example, dimethylformamide), sulfoxides (for example, dimethylsulfoxide) and nitriles (for example, acetonitrile and benzonitrile). These solvents may be used alone or in combination of two or more A content of the solvent may be determined, considering a thickness (film thickness) of the polymer film containing a metal component to be deposited on the reflecting substrate; for example, the solvent is contained about 10 to 10000 parts by weight, preferably 30 to 5000 parts by weight, more preferably 50 to 3000 parts by weight, to 100 parts by weight of the polymer.

There are no particular restrictions to a method for coating a polymer solution containing a metal component on a reflecting substrate as long as it can form a film, and any of conventional methods can be used, including spin coating, roll coating, curtain coating, dip coating and casting. An application apparatus may be selected from those corresponding to the above application methods such as spin coater, slit coater, roll coater and bar coater.

There are no particular restrictions to a method for evaporating a solvent in the polymer solution containing a metal component which has been applied to the substrate, and it may be selected from the conventional solvent evaporation methods such as vaporization by heating and vacuum drying by any of various evaporators.

There are no particular restrictions to a thickness of the polymer film containing a metal component which has been thus formed on the reflecting substrate, and it can be appropriately selected depending on a use application. The film may be formed in a thickness of, for example, about 0.5 to 500 µm, preferably 0.5 to 100 µm, more preferably 1 to 20 µm.

Light Irradiation

In a manufacturing process of this invention, the polymer film containing a metal component which has been formed on the reflecting substrate is then irradiated with light at a particular wavelength $\lambda$. The wavelength $\lambda$ may be any desired wavelength, but must be selected from such a wavelength range that irradiation of the above metal component with the light at the wavelength can cause any of formation of metal particles, transfer of the metal particle and growth of metal particles. It is generally selected from a wavelength range having an adequate energy to excite and reduce the metal compound to metal particles; preferably an ultraviolet to visible-light range. Specifically, one wavelength is selected from a wavelength range of 200 to 600 nm, preferably 300 to 500 nm, more preferably 350 to 500 nm. In such a wavelength range, various metal compounds can be efficiently photoreduced into metal particles Examples of a light source used for irradiation include halogen lamps, mercury lamps (for example, low-pressure mercury lamp, high-pressure mercury lamp and extra high-pressure mercury lamp), deuterium lamps, UV lamps and laser (for example, helium-cadmium laser and excimer laser). In one embodiment, an extra high-pressure mercury lamp is suitable. Furthermore, it is particularly preferable that light at one wavelength with a narrow half width is irradiated. A half width of an irradiated wavelength is preferably 50 nm or less, more preferably 30 nm or less, particularly preferably 20 nm or less, most preferably 10 nm or less. For narrowing a half width, it is preferable to combine commercially available narrow-band pass filters.

A light irradiation time substantially depends on capacity of an irradiating light source (irradiation intensity), but is preferably determined, also taking into account other factors such as a reaction rate and transfer of a metal component as well as a size of metal particles formed. An irradiation time may be, but not limited to, 20 min to 6 hours, preferably 30 min to 3 hours, particularly preferably 30 min to 2 hours when using a 500 W high-pressure mercury lamp (irradiation intensity: 165 W/cm$^2$ or higher).

Aligned Metal Particle Film

By the above irradiation step, a metal compound in the polymer film containing the metal component gives metal particles, and/or metal particles move and aggregate to form a layer parallel to the film surface and further, such layers are formed to give a periodic multilayer structure. Viewing in a cross-sectional direction of the film, there is formed a multilayer structure of alternately piled metal particle layers in which metals are condensed and layers made of only the polymer.

Figure 26:
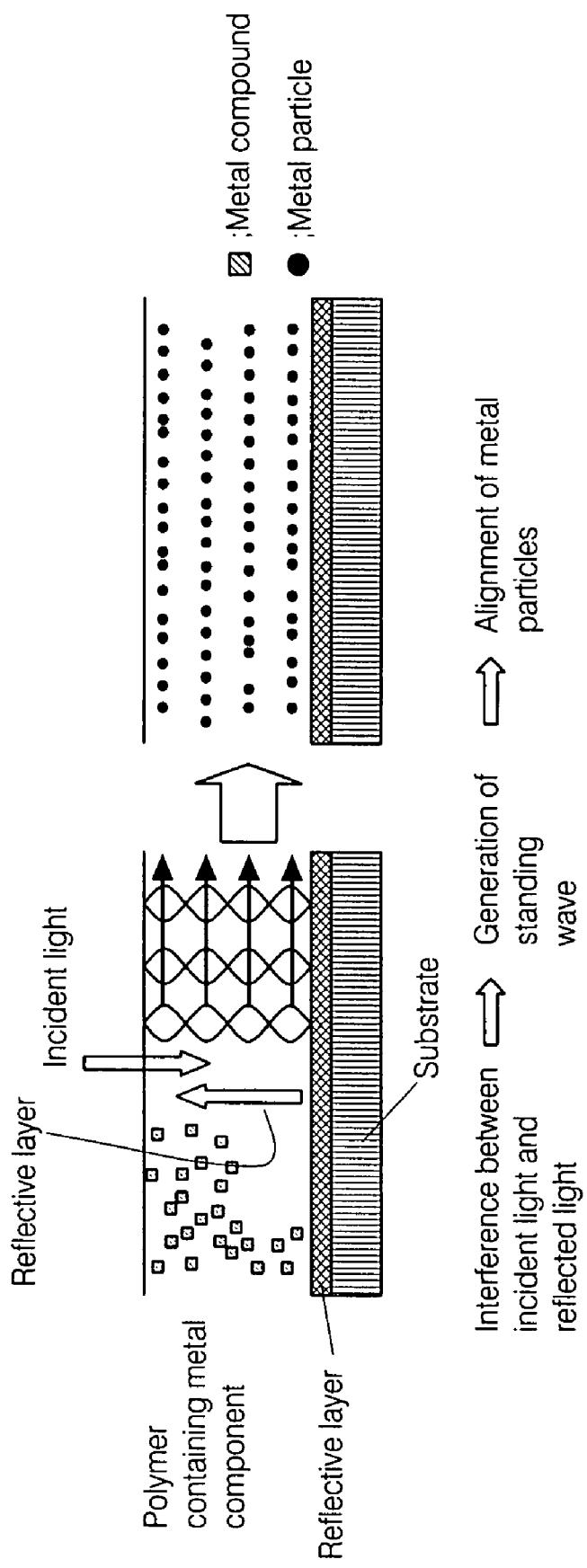
FIG. 26 is a conceptual figure showing a putative mechanism of forming a multilayer structure comprising alternately piled metal particle layers and polymer layers in a manufacturing process of this invention.

FIG. 26 shows a conceptual diagram of an assumed mechanism of forming such a multilayer structure. As shown in this figure, interference between an incident light and a reflected light generates a standing wave having a periodic light intensity distribution, resulting in formation of metal particles mainly in the position with a larger light intensity. Furthermore, it can be assumed that since light is an electromagnetic wave, an electric field is stronger in the position where the light intensity is larger, and thus metal particles transfer from the position with a weaker electric field to part with a stronger electric field, resulting in a multilayer structure. Furthermore, it can be assumed that within the polymer containing metal particles, there is also stationary electric-field distribution, so that by a similar mechanism, metal particles move to form a multilayer structure.

In a manufacturing process of this invention, a repeating distance (pitch) of metal particle layers can be deliberately regulated. Repeating distance (pitch) of metal particle layers in a polymer film is regulated, according to the above theory, by controlling a period of light intensity generated in a thickness direction of the polymer film. Typically, it can be regulated by varying a wavelength $\lambda$ of an irradiating light. For example, making a wavelength of the irradiating light longer leads to increase in a repeating distance of metal particle layers. Furthermore, a repeating distance (pitch) of metal particle layers can be also regulated by varying an angle of the irradiated light. For example, an incidence angle of the irradiated light can be increased to make a repeating distance of metal particle layers longer. Variation of an incidence angle is a very convenient method because it can be achieved only by inclining a substrate or irradiating the light at a particular angle. Furthermore, in this method, a repeating distance of metal particle layers can be regulated independently of a wavelength of the irradiated light, so that light at a wavelength suitable for the reaction can be selected during manufacturing. In addition, it is also easy to prepare a film which can selectively reflect light at a wavelength different from that of the irradiated light. In a metal particle film of this invention, such deliberate control can be conducted to determine alignment of metal particle layers. By the way, processing after irradiation may lead to reduction or increase of a film thickness, and in such a case, a repeating distance (pitch) of metal particle layers may be varied.

Interference tends to occur in light transmitted through two different paths from one light source, and positions where enhancement or attenuation is observed are determined by an optical path difference between two lights. Therefore, more specifically, the following theoretical explanation would be applicable.

Figure 27A:
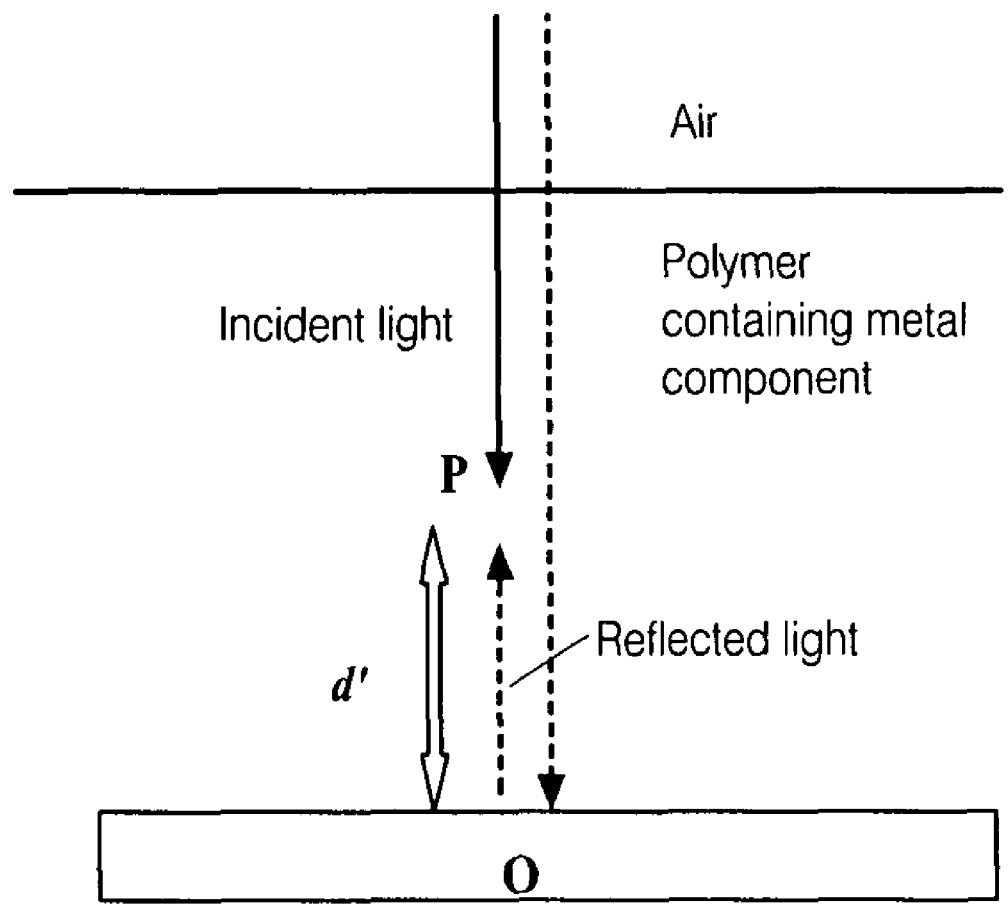
FIG. 27A is a conceptual figure theoretically illustrating the conditions for interference between an incident light and a reflected light from a substrate when the incident light is vertically irradiated.

For example, herein, on vertical irradiation with an incident light, it is assumed that there occurs interference between an incident light having a wavelength $\lambda$ from a light source and a reflected light from a substrate at point P with a geometric distance "d" from a reflecting substrate. FIG. 27(A) is a conceptual diagram theoretically illustrating the phenomenon. In this invention, since a refractive index of the film is more than that of the reflecting substrate, reflection occurs for an incident light from a substance having a larger refractive index to a substance having a smaller refractive index, without inversion of a light phase at point O due to the reflection. In other words, for causing interference between an incident light and a reflected light at this point, an optical path difference between the incident light and the reflected light=2×OP must be an integral multiple of an incident wavelength in the film.

That is, interference occurs when d' meets the following equation:

$$2d'=m\lambda'=m\lambda/n (m=0, 1, 2 \ldots)$$

where d' is a geometric distance from a reflecting substrate; λ is a wavelength of an irradiating light; λ' is a light wavelength in a film; and n is a refractive index of a polymer containing a metal component.

An interference point is determined by a distance from a reflecting substrate, and there, therefore, exist interference points as a layer in a direction parallel to the substrate, by which the results in Examples of this invention described below can be theoretically explained.

Figure 27B:
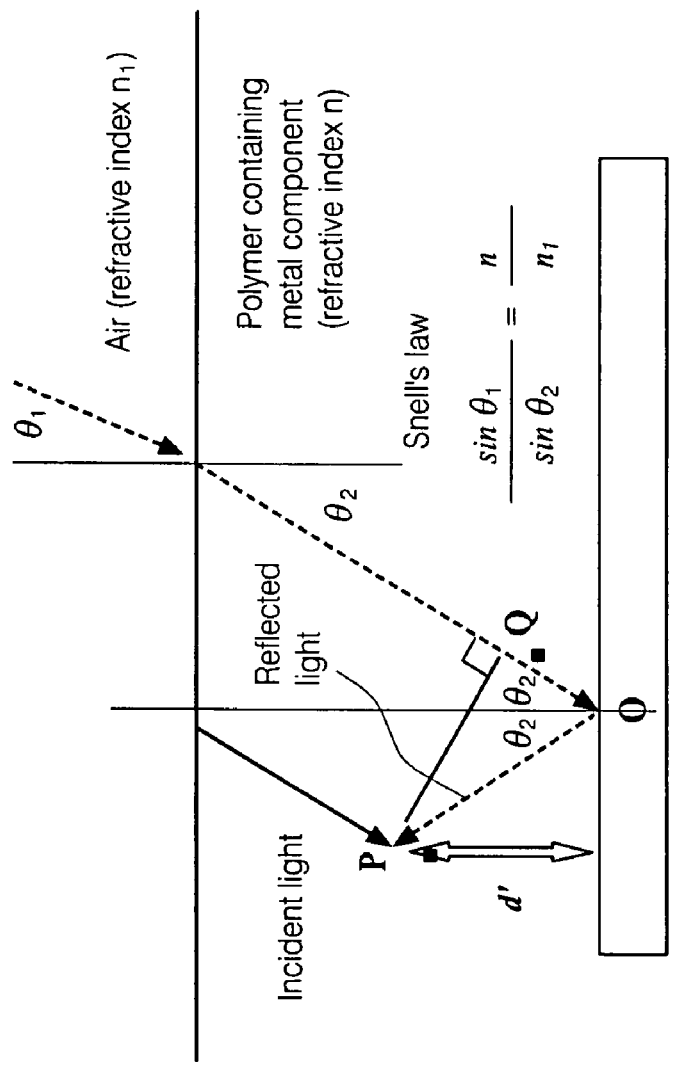
FIG. 27B is a conceptual figure theoretically illustrating the conditions for interference between an incident light and a reflected light from a substrate when the incident light is irradiated at a given incident angle of $\theta_1$.

Similarly, the following description may be true when a thin film is light-irradiated at a given incident angle $\theta_1$. FIG. 27B is a conceptual figure theoretically illustrating the phenomenon. As in vertical irradiation, for causing interference between an incident light and a reflected light at this point, an optical path difference between the incident light and the reflected light=OP+OQ must be an integral multiple of an incident wavelength in the film. When the film is irradiated at an incident angle $\theta_1$, an incident angle $\theta_2$ in the film meets the Snell's law shown in the figure. A refractive index of the film can be used to calculate an incident angle $\theta_2$ in the film.

Considering an optical path difference=OP+OQ, the optical path difference can be expressed as 2d' cos $\theta_2$ by using the trigonometric theorem. Thus, interference occurs when d' meets the following equation:

$$2d' \cos \theta_2 = m\lambda' = m\lambda/n (m=0, 1, 2, \ldots)$$

where d' is a geometric distance from a reflecting substrate; $\theta_2$ is an incident angle in a film; λ is a wavelength of an irradiating light; λ' is a light wavelength in a film; and n is a refractive index of a polymer containing a metal component.

Considering the whole thin film, an interference point is determined, as in vertical irradiation, by a distance from a reflecting substrate, and there, therefore, exist interference points as a layer in a direction parallel to the substrate, by which the results in Examples of this invention described below can be theoretically explained.

Metal particles in a metal particle layer are very small at the time of generation, but condensation and agglomeration generally observed in metal particles increase particle sizes and sometimes lead to a state which can be substantially considered to be a metal film. Likewise, in a polymer containing metal particles, while a light intensity is increased, a difference of electric field intensity generated as a standing wave between the positions with a larger and a smaller intensity, resulting in increase in a size of movable metal particles.

As described above, the size is generally 2 to 100 nm although it depends on the conditions. In particular aspects, majority of particles (for example, 80% or more) have a nano-level particle size of 50 nm or less. An aligned metal particle film will be used in various use applications, utilizing the periodic multilayer structure of a metal particle layer. Typically, it can be used as a reflective film as described below. An aligned metal particle film thus prepared may be used in a state which it is formed on a reflecting substrate or after being released.

Second Embodiment of this Invention

In the manufacturing process described above (referred to as the "first embodiment"), an aligned metal particle film is formed on a reflecting substrate, so that depending on selection of materials, the aligned metal particle film may not be released from the reflecting substrate, leading to limitation in its applications. In terms of the second embodiment, there will be described a process for obtaining an aligned metal particle film as a self-supporting film. In the description of the second embodiment, as long as no discrepancies are present, the descriptions in the first embodiment (for example, materials, conditions and preferable ranges) are employed regarding the items which are not explicitly mentioned.

In the second embodiment, a polymer film containing a metal component is not formed directly on a reflecting substrate, but first, a release layer is formed on the reflecting substrate. There are no particular restrictions to a material for the release layer as long as it does not interfere with irradiation with light at a particular wavelength λ, that is, a material transparent at the wavelength and releasable from the reflecting substrate to give an aligned metal particle film. Examples of release styles include removing the release layer itself in a subsequent step to release an aligned metal particle film; releasing a release layer together with an aligned metal particle film in a subsequent step because of weak adhesion strength between a reflecting substrate and the release layer; and releasing an aligned metal particle film alone in a subsequent step because of weak adhesion strength between a release layer and the aligned metal particle film.

For stable release, removing the release layer itself in a subsequent step is preferable, and particularly preferably the release layer is removed by dissolving it in a solvent. A release layer for the release is preferably made of a polymer such as a polymer insoluble in a solvent in a polymer solution containing a metal component.

Examples of such a polymer include polycarbonates, polyesters such as polyethylene terephthalate, polybutylene terephthalate and polyethylene naphthalate; acrylic polymers such as polymethyl methacrylate; styrene resins such as methylstyrene resins, acrylonitrile-butadiene-styrene (ABS) resins and acrylonitrile-styrene (AS) resins; polyolefins such as polyethylene, polypropylene and polymethylpentene; polyethers such as polyoxetane; transparent polyamides such as Nylon® 6 and Nylon® 66; and various transparent polymers such as polystyrene, polyvinyl chloride, polyether sulfone, polysulfone, polyacrylate and cellulose triacetate, polyvinyl alcohol, polyacrylonitrile, polyvinyl chloride, cyclic polyolefins, acrylic resins, epoxy resins, cyclohexadiene polymers, amorphous polyester resins, transparent polyimides, transparent polyurethanes, transparent fluororesins, thermoplastic elastomers and polylactic acid. Furthermore, a copolymer of a monomer as a component of the polymer and/or a mixture of these polymers may be used. Among these, styrene is suitably used.

The release layer preferably has a smaller thickness for preventing irradiation from disturbing metal particle alignment in the polymer; it is for example about 0.01 to 50 μm, preferably 0.01 to 20 μm, more preferably 0.01 to 5 μm.

The layer may be formed by, for example, removing a solvent after applying the polymer solution, or alternatively by applying a monomer, optionally with an initiator, before polymerization. The application method may be selected from conventional application methods such as spin coating, roll coating, curtain coating, dip coating and casting. An application apparatus may be selected from those corresponding to the above application methods such as spin coater, slit coater, roll coater and bar coater.

After forming the release layer on the reflecting substrate, a polymer film containing a metal component is formed on the release layer as described in the first embodiment, and then irradiated with light at a particular wavelength λ. The polymer film becomes an aligned metal particle film in which metal particle layers are aligned in a multilayer manner.

Next, the polymer after irradiation, that is, the aligned metal particle film, is released from the reflecting substrate. The releasing method depends on a release layer material. When the release layer reduces adhesion strength in an interface, it can be mechanically released.

When the release layer is made of a releasable material, particularly made of the above soluble material, a release layer is immersed in a solvent in which the release layer can be dissolved but the aligned metal particle film is insoluble, to dissolve/remove the release layer. As a result, the aligned metal particle film can be released from the reflecting substrate.

The aligned metal particle film thus prepared and released from the reflecting substrate can be used as it is or after adhering it to an appropriate substrate. For example, when the aligned metal particle film is adhered or laminated on a transparent or opaque film or sheet, particularly a resin (polymer) film or sheet as a substrate, mechanical strength and handling properties can be improved without deterioration in mechanical flexibility or lightweight properties of the aligned metal particle film of this invention, which can be used in various applications.

Application as a Reflective Film

The aligned metal particle films described above as the first and the second embodiments may be used in various applications, particularly useful as a reflective film. Determination of reflection properties of the aligned metal particle film show as described in Examples below that the film has a reflection maximum value at a wavelength position substantially equal to the wavelength λ in the light irradiation and thus it can play a role as a reflective film exhibiting wavelength selectivity.

Thus, calculation for a simulation model where metal layers (semi-reflective and semi-transmissive) are piled as a multilayer with a period d of an optical distance in a transparent layer indicates that light at a wavelength λ meeting the following equation is selectively reflected:

$$d = \lambda/2$$

i.e. $d' = \lambda'/2 = \lambda/(2n)$ where d is an optical distance; d' is a geometric distance; λ is a reflection wavelength; λ' is a wavelength in the polymer; and n is a refractive index of the polymer.

In an aligned metal particle film prepared in this invention, metal particle layers are piled in a substantially equal pitch, and it can be, therefore, presumed that the metal particle layers act like a semi-reflective/semi-transmissive layer. It may be probable that when a period of the metal particle layers (a distance between the centers of the layers) is expressed using an optical distance d (geometric distance d'=d/n, where n is a refractive index of the polymer), a maximum-value position in a reflection spectrum corresponds to a wavelength λ meeting the above equation. However, various factors such as metal particle distribution and density would affect selectivity properties such as a peak half width and suppression of reflection at other wavelengths.

An aligned metal particle film of this invention released from a reflecting substrate is so flexible that it may be inserted in a transparent substrate such as a quartz plate and a resin (polymer) film or sheet, to produce a chip or element. This structure minimizes light dispersion and thus improves its properties as a reflective film exhibiting wavelength selectivity.

Aligned metal particle films released from a reflecting substrate can be closely laminated by piling a plurality of them or folding the thin film so as to form a laminate. The laminate thus formed has improved reflection properties. The effect of improving reflection properties of the laminate by piling tends to be saturated, and it is, therefore, preferable to pile for example about 2 to 20, preferably 2 to 15, more preferably 2 to 10 sheets of the film when laminating the aligned metal particle film with a thickness of about 2 μm.

As indicated in Examples described later, it has been shown that a wavelength and/or an incident angle of an irradiating light can be varied to control a repeating distance in metal particle layers and thus to prepare a film capable of selectively reflecting light at a wavelength different from the wavelength of the irradiating light. As described above, this invention can easily provide a film capable of selectively reflecting lights at various wavelengths.

An aligned metal particle film prepared by the present invention can be used in place of a conventional optical multilayer reflective film made of an inorganic material or inorganic oxide. Thus, it can improve certain properties such as lightweight, transportability, impact resistance and mechanical flexibility, so that it can be used in a wide range of applications such as optical components as an optical material.

EXAMPLES

There will be more specifically described the present invention with reference to, but not limited to, Examples.

First, there will be described examples of optical multilayer reflective film, which is the first main aspect of the present invention.

Reference Example A-1

Using silver as a metal layer and silica as a transparent film layer, a film configuration selectively reflecting light at a wavelength of 457 nm was calculated by an optical film designing software, Essential Macleod. From the calculation results, it was expected that a film selectively reflecting light at a wavelength of 457 nm with a high reflectance of 50% or more could be obtained. FIG. 1 shows a reflection spectrum expected from the calculation.

Example A-1

Based on the optical calculation results from Reference Example A-1, a selective wavelength-reflecting film selectively reflecting light at a wavelength of 457 nm was formed by sputtering. By sputtering at AC sputtering at 13.56 MHz, on a soda-lime glass was deposited a silica film, on which was then deposited a silver film by DC sputtering, and the process was repeated to form alternate 41 layers, in which the final layer was a silica film. The sputtering conditions were selected such that thicknesses of a silica and a silver films were 140 nm and 10 nm, respectively.

Figure 2:
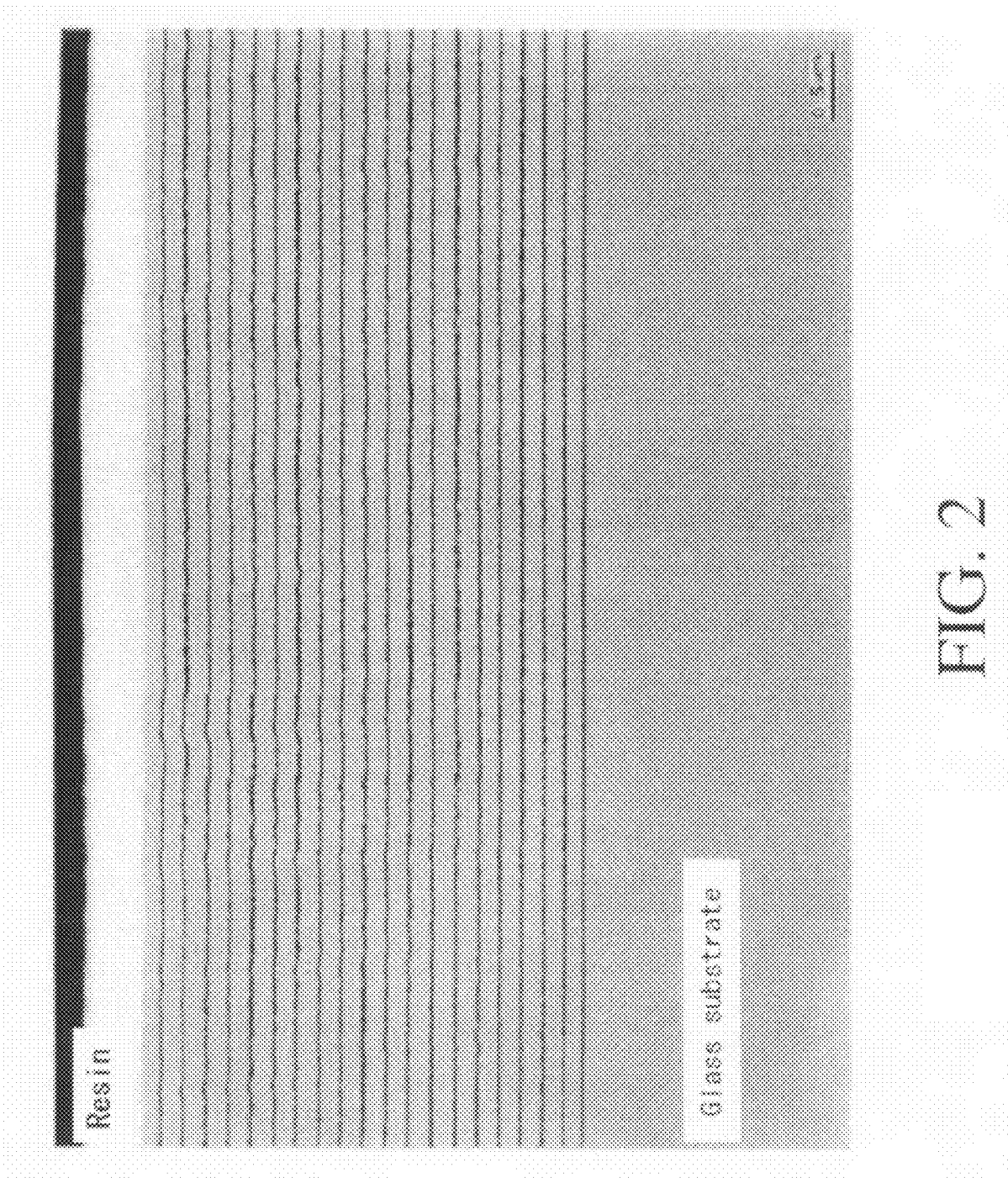
FIG. 2 shows the TEM observation results for the optical multilayer film prepared in Example A-1.

The multilayer film thus obtained was observed by a transmission electron microscope (TEM), as shown in FIG. 2.

Figure 3:
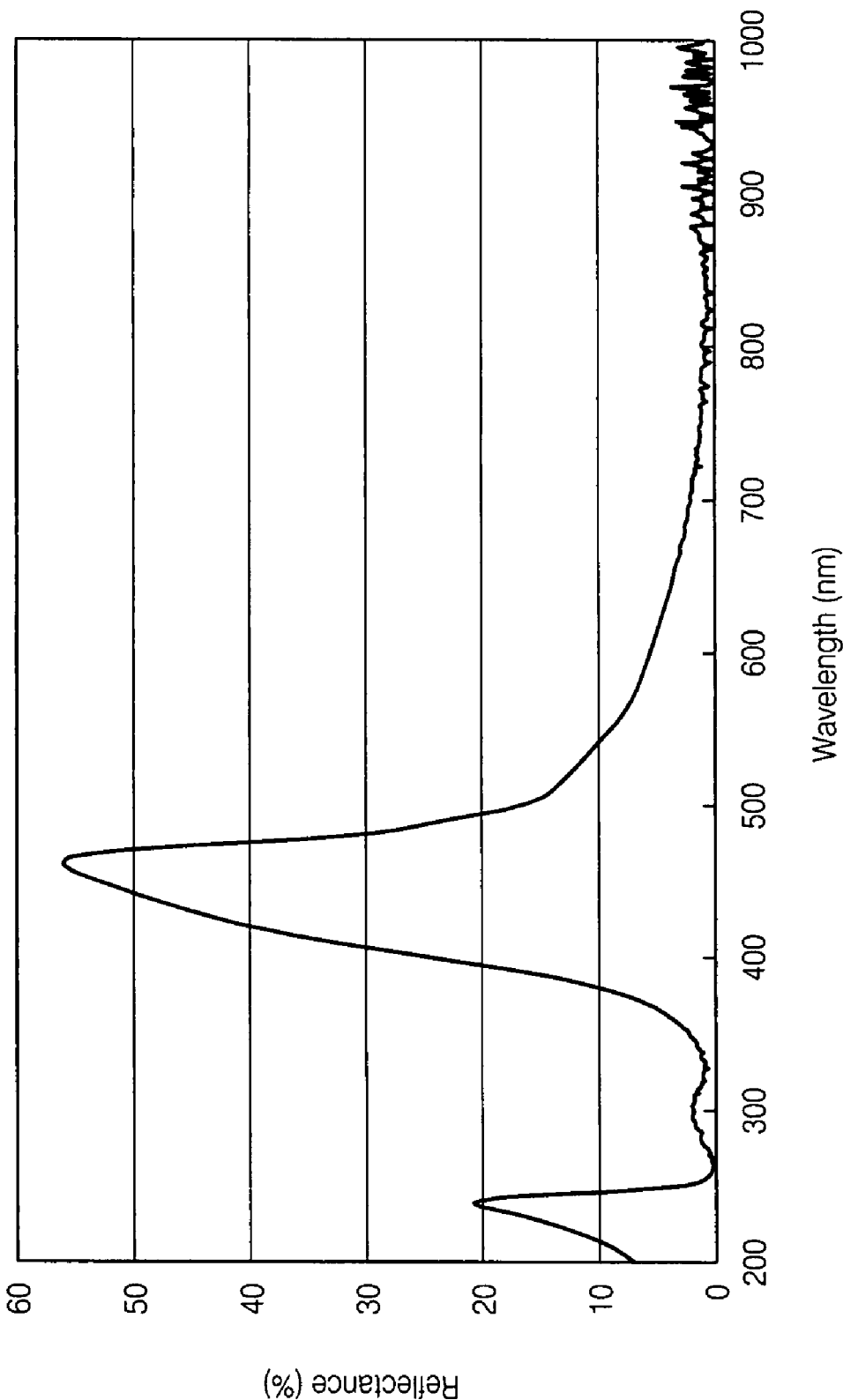
FIG. 3 shows the reflection properties of the optical multilayer film on a soda-lime glass in Example A-1.

Reflection properties were determined for the optical multilayer film formed on the soda-lime glass, and the results indicate that the film obtained have a reflection maximum at a wavelength of 457 nm with a reflectance of 56.1%, that is, a desired wavelength is reflected. The results of reflection property determination are shown in FIG. 3.

Figure 4:
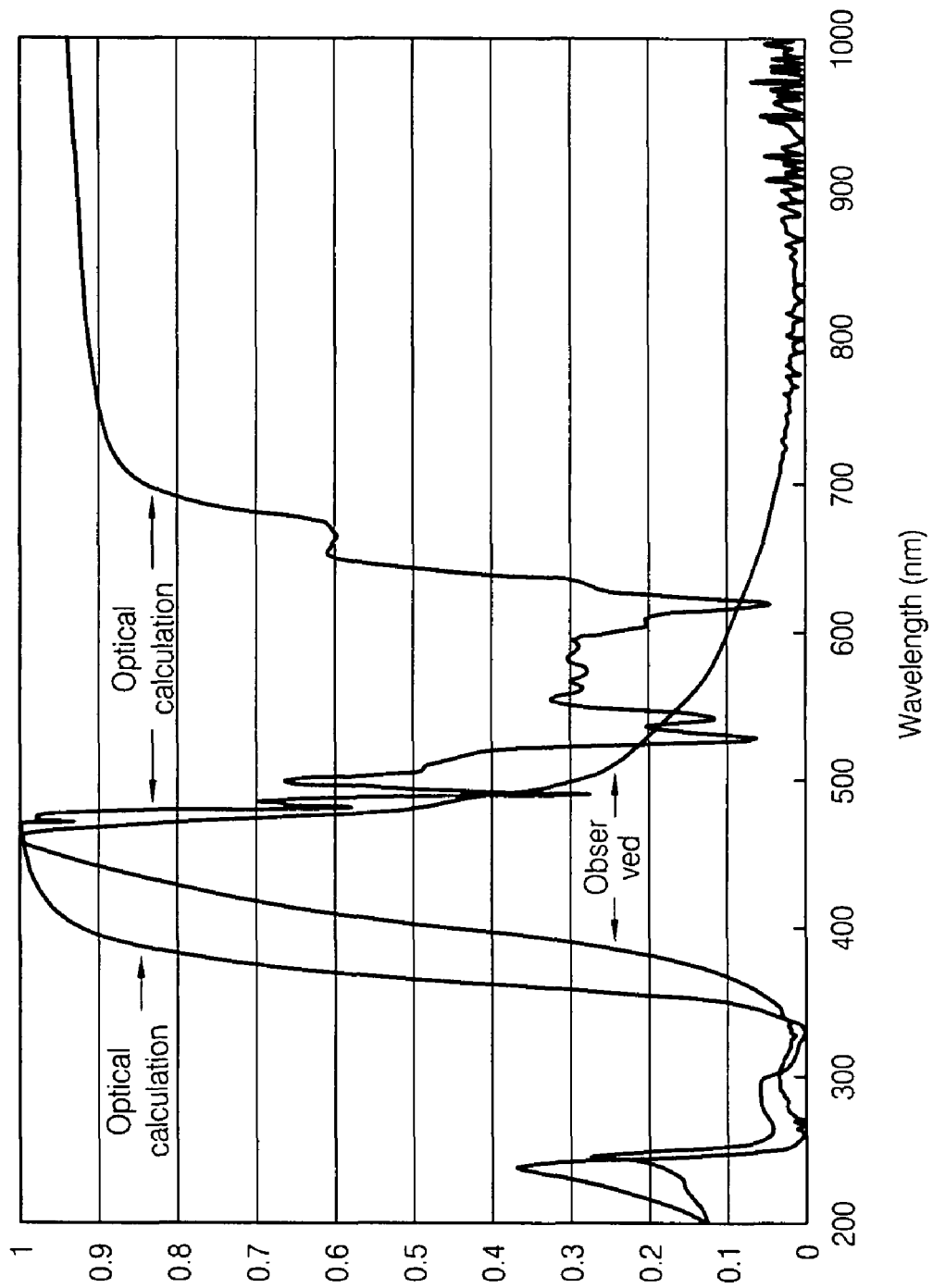
FIG. 4 shows comparison of the observed reflection properties for the optical multilayer film in Example A-1 with the expected reflection properties obtained from optical calculation in Reference Example A-1, where the data are normalized such that a peak in the reflection maximum is 1.

The measured results and the calculation results are shown together in FIG. 4. The results indicate that a multilayer reflective film exhibiting wavelength selectivity can be designed by optical calculation and then a multilayer reflective film of the present invention can be prepared on the basis of the design.

Reference Example A-2

Figure 5:
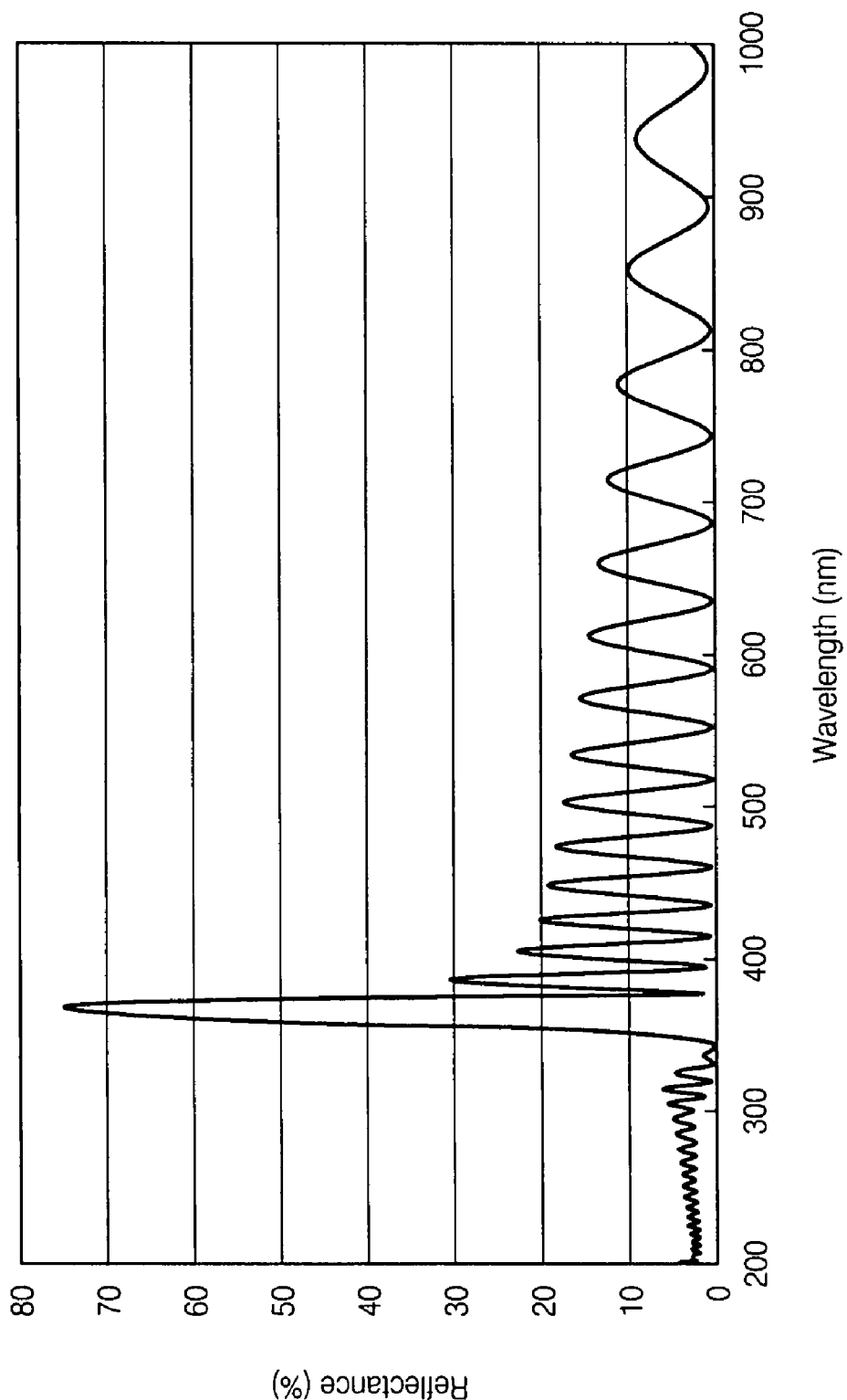
FIG. 5 shows expected optical properties obtained by an optical film designing software, Essential Macleod, in Reference Example A-2.

As described in Reference Example A-1, a configuration of a 41-layer multilayer film reflecting light at a wavelength of 365 nm corresponding to i line from a mercury lamp was determined using the optical film designing software, Essential Macleod. The result obtained was a configuration of 60.5 nm silica/3 nm silver/122.5 nm silica/3 nm silver/ . . . /122.5 nm silica/3 nm silver/60.5 nm silica/soda-lime glass. A reflectance at the designed center wavelength of 365 nm was 75% and a wavelength half width was 19 nm. The expected reflection properties are shown in FIG. 5.

Reference Example A-3

Figure 6:
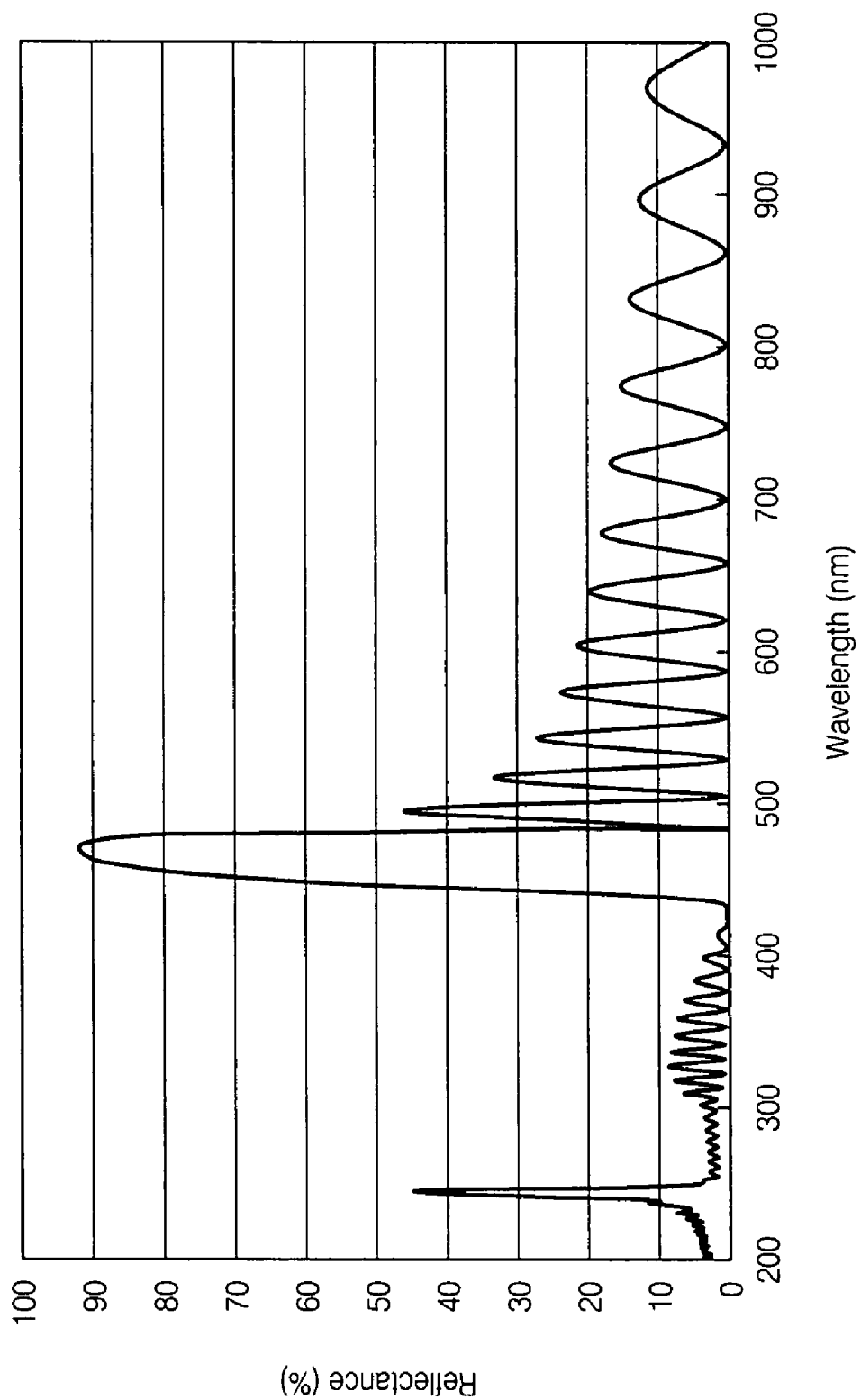
FIG. 6 shows expected optical properties obtained by an optical film designing software, Essential Macleod, in Reference Example A-3.

As described in Reference Example A-1, a configuration of a 41-layer multilayer film reflecting light at a wavelength of 460 nm corresponding to blue light was determined using the optical film designing software, Essential Macleod. The result obtained was a configuration of 77.5 nm silica/3 nm silver/156.5 nm silica/3 nm silver/ . . . /156.5 nm silica/3 nm silver/77.5 nm silica/soda-lime glass. A reflectance at the designed center wavelength of 460 nm was 92% and a wavelength half width was 36 nm. The expected reflection properties are shown in FIG. 6.

Reference Example A-4

Figure 7:
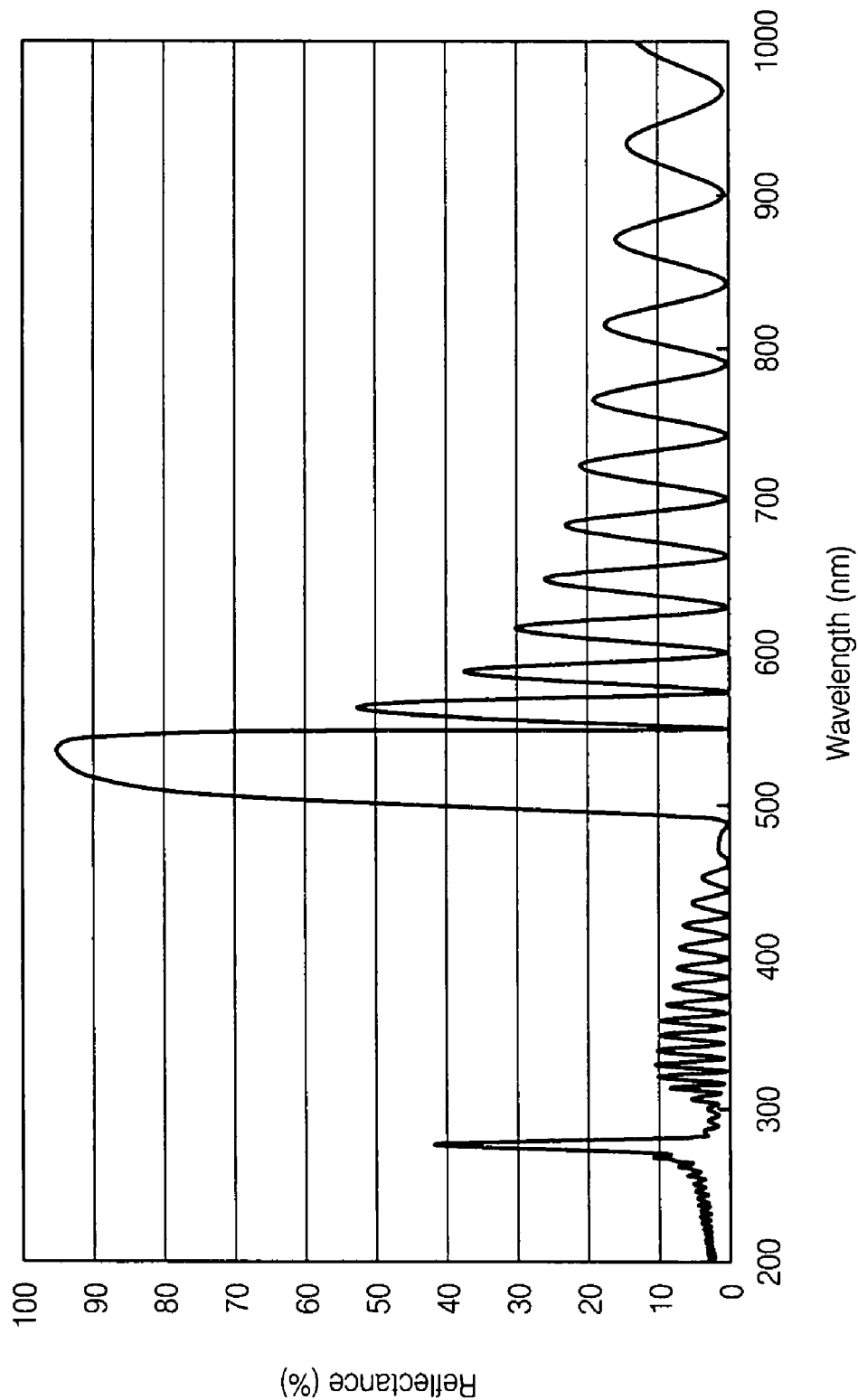
FIG. 7 shows expected optical properties obtained by an optical film designing software, Essential Macleod, in Reference Example A-4.

As described in Reference Example A-1, a configuration of a 41-layer multilayer film reflecting light at a wavelength of 530 nm corresponding to green light was determined using the optical film designing software, Essential Macleod. The result obtained was a configuration of 89 nm silica/3 nm silver/179.5 nm silica/3 nm silver/ . . . /179.5 nm silica/3 nm silver/89 nm silica/soda-lime glass. A reflectance at the designed center wavelength of 530 nm was 95% and a wavelength half width was 48 nm. The expected reflection properties are shown in FIG. 7.

Reference Example A-5

Figure 8:
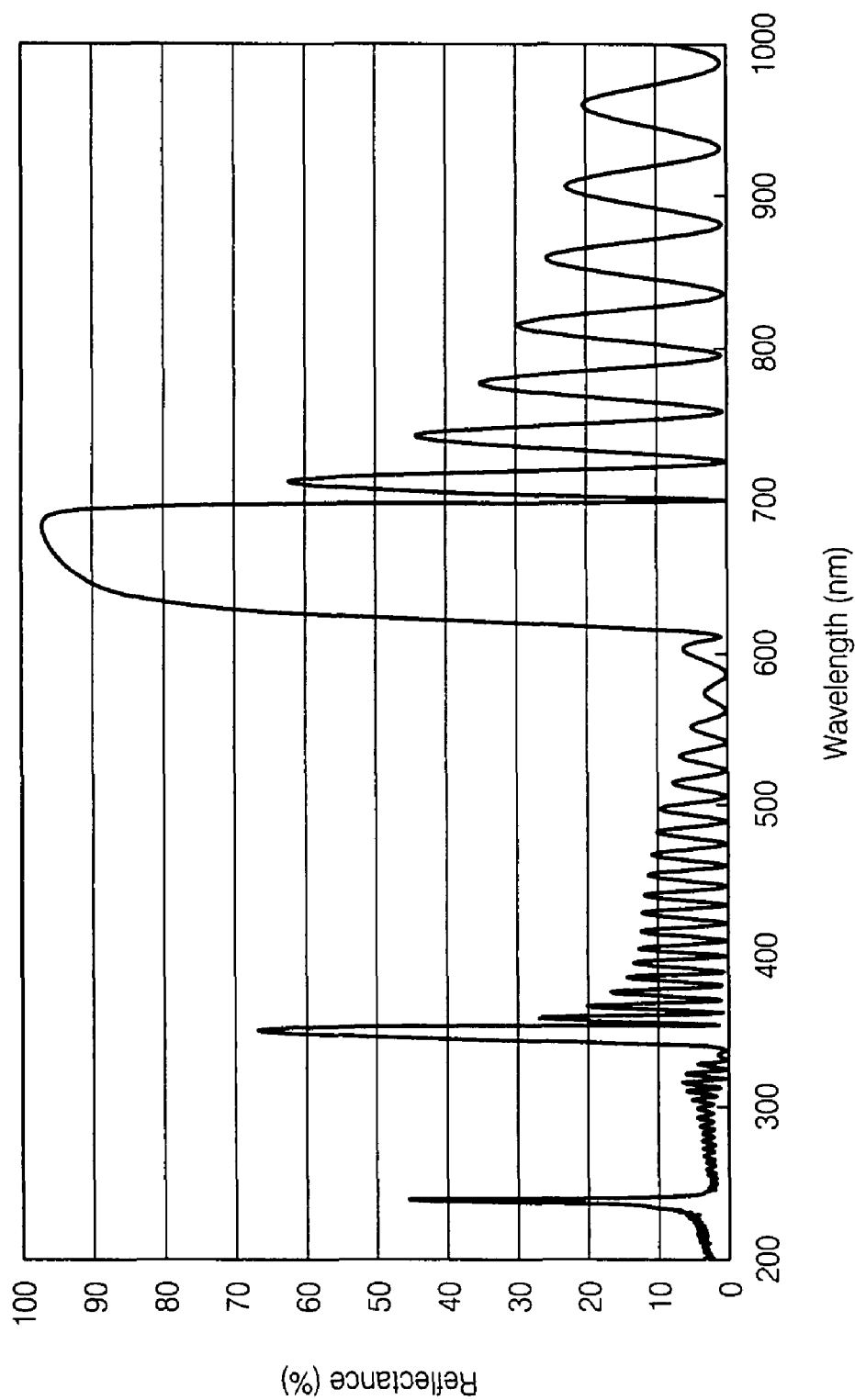
FIG. 8 shows expected optical properties obtained by an optical film designing software, Essential Macleod, in Reference Example A-5.

As described in Reference Example A-1, a configuration of a 41-layer multilayer film reflecting light at a wavelength of 680 nm corresponding to red light was determined using the optical film designing software, Essential Macleod. The result obtained was a configuration of 165 nm silica/3 nm silver/231.5 nm silica/3 nm silver/ . . . /231.5 nm silica/3 nm silver/165 nm silica/soda-lime glass. A reflectance at the designed center wavelength of 680 nm was 97% and a wavelength half width was 76 nm. The expected reflection properties are shown in FIG. 8.

Next, there will be described examples of aligned metal particle film, which is the second main aspect of the present invention.

Example B-1

On a soda lime glass was deposited aluminum to 200 nm by DC sputtering and then silica to 10 nm by AC sputtering at 13.56 MHz, to form a reflecting substrate. To the reflecting substrate was spin-coated (1500 rpm, 10 sec) a solution obtained by dissolving 63.1 mg of silver perchlorate in 5.01 g of a 10 wt % solution of polymethacrylic acid in methanol, which was then dried at room temperature for 3 hours. Then, the film on the reflecting substrate was irradiated with vertical UV-ray at a wavelength of 365 nm for 1 hour, using a high-pressure mercury lamp (Ushio, Inc., "Multilight") and a narrow-band pass filter.

Figure 9:
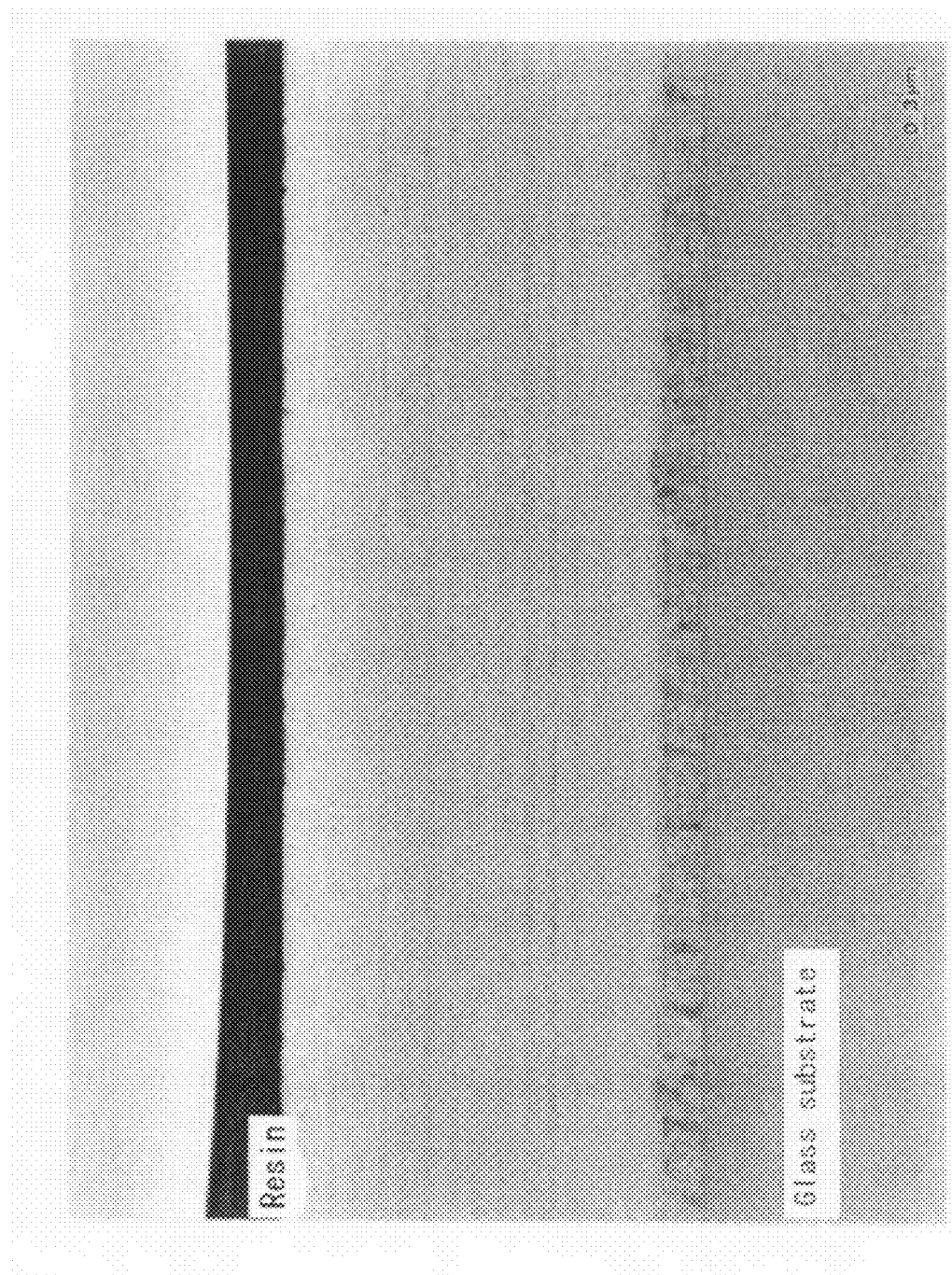
FIG. 9 shows a TEM photograph of the aligned metal particle film prepared in Example B-1, consisting of a glass substrate, an aluminum layer, a silica layer and an aligned silver-particle polymer layer in sequence from the bottom.

FIG. 9 shows a transmission electron microscopy (TEM) photograph of a cross section of the film thus obtained on the reflecting substrate. It was found that silver particles were aligned in polymethacrylic acid as a layer with an interval of 90 nm (geometric distance) in parallel with the substrate. It was furthermore observed that majority of the silver particles had a particle size of 10 nm or less.

Comparative Example B-1

In 5.01 g of a 10 wt % solution of polymethacrylic acid in methanol was dissolved 63.1 mg of silver perchlorate. The resulting solution was spin-coated on a soda lime glass (1500 rpm, 10 sec), and then dried at room temperature for 3 hours. Then, the film on the reflecting substrate was irradiated with vertical UV-ray at a wavelength of 365 nm, using a high-pressure mercury lamp (Ushio, Inc., "Multilight") and a narrow-band pass filter.

Figure 10:
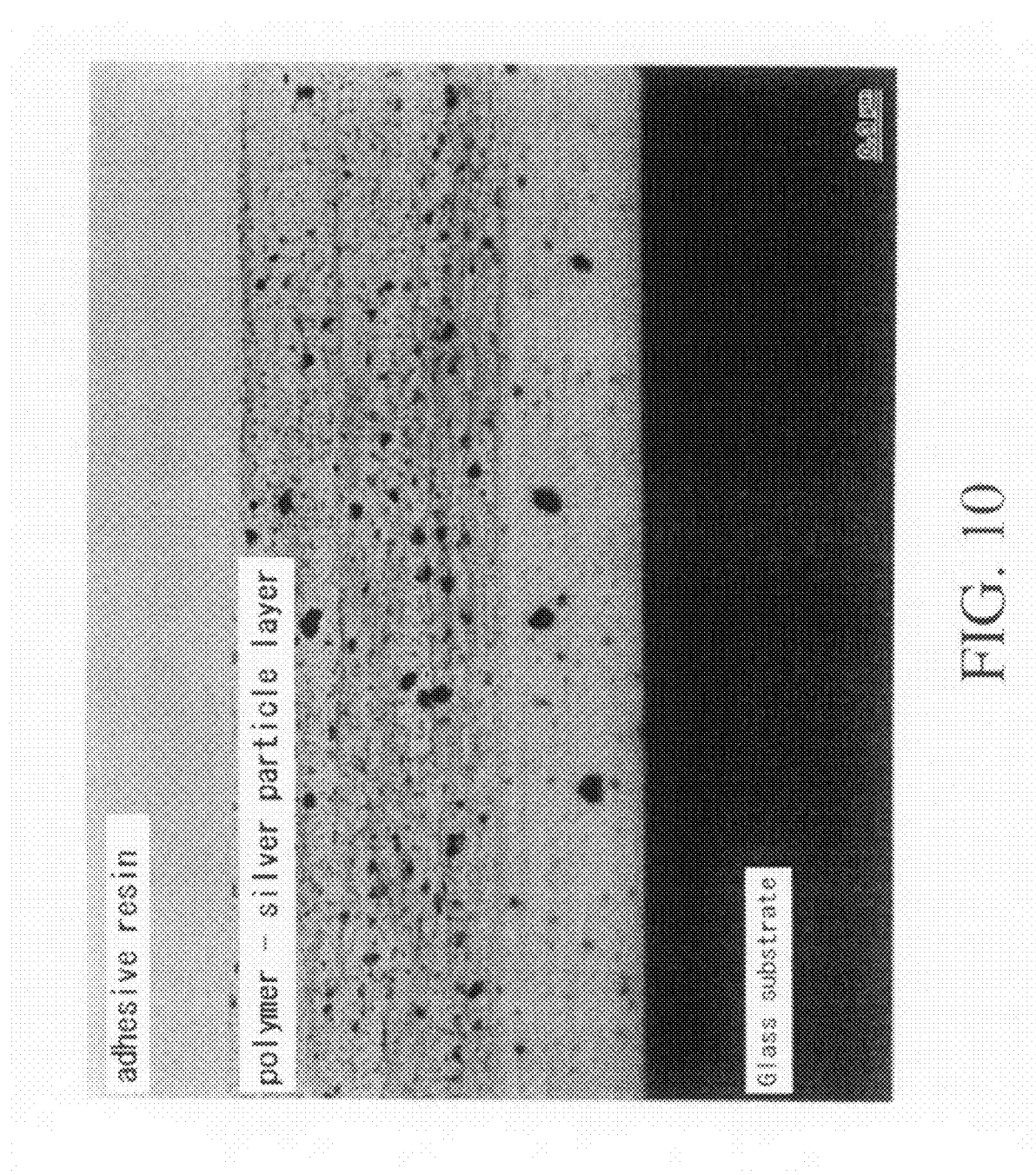
FIG. 10 shows a TEM photograph of the metal-polymer composite in Comparative Example B-1, consisting of a glass substrate, an aluminum layer, a silica layer and a metal-polymer composite layer in sequence from the bottom.

FIG. 10 shows a transmission electron microscopy (TEM) photograph of a cross section of the film thus obtained on the reflecting substrate. Sizes of silver particles precipitated in polymethacrylic acid were irregular, and there was not observed a structure where silver particles are aligned as a layer in parallel with the substrate, as observed when using a reflecting substrate.

Example B-2

On the reflecting substrate prepared in Example B-1 was spin-coated (1500 rpm, 10 sec) a 10 wt % solution of polystyrene in toluene, which was then dried at room temperature for 3 hours. Furthermore, on the film on the substrate was spin-coated (1500 rpm, 40 sec) a solution prepared by adding dropwise 2.44 g of 71.7 mg of silver perchlorate in methanol to 2.51 g of a 10 wt % solution of polyacrylic acid in methanol. The substrate was dried at room temperature for 3 hours. Then, the film on the reflecting substrate was irradiated with vertical UV-ray at a wavelength of 365 nm for 1 hour, using a high-pressure mercury lamp (Ushio, Inc., "Multilight") and a narrow-band pass filter. The sample thus obtained was immersed in xylene to dissolve the styrene layer to release an aligned metal particle film from the reflecting substrate.

Figure 11:
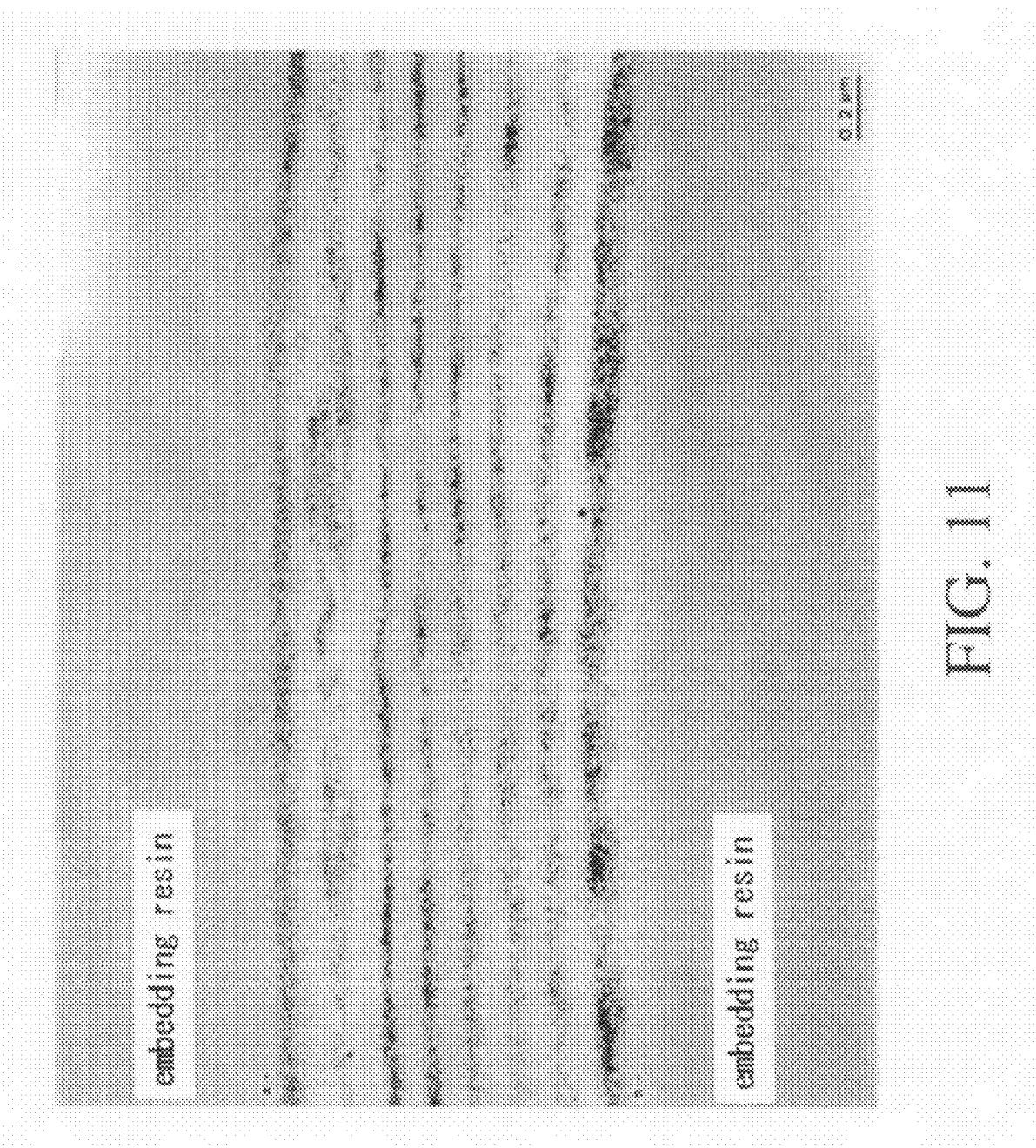
FIG. 11 shows a TEM photograph of the aligned metal particle film in Example B-2, where the upper and the lower parts are embedding resin for preparing a sample.
Figure 12:
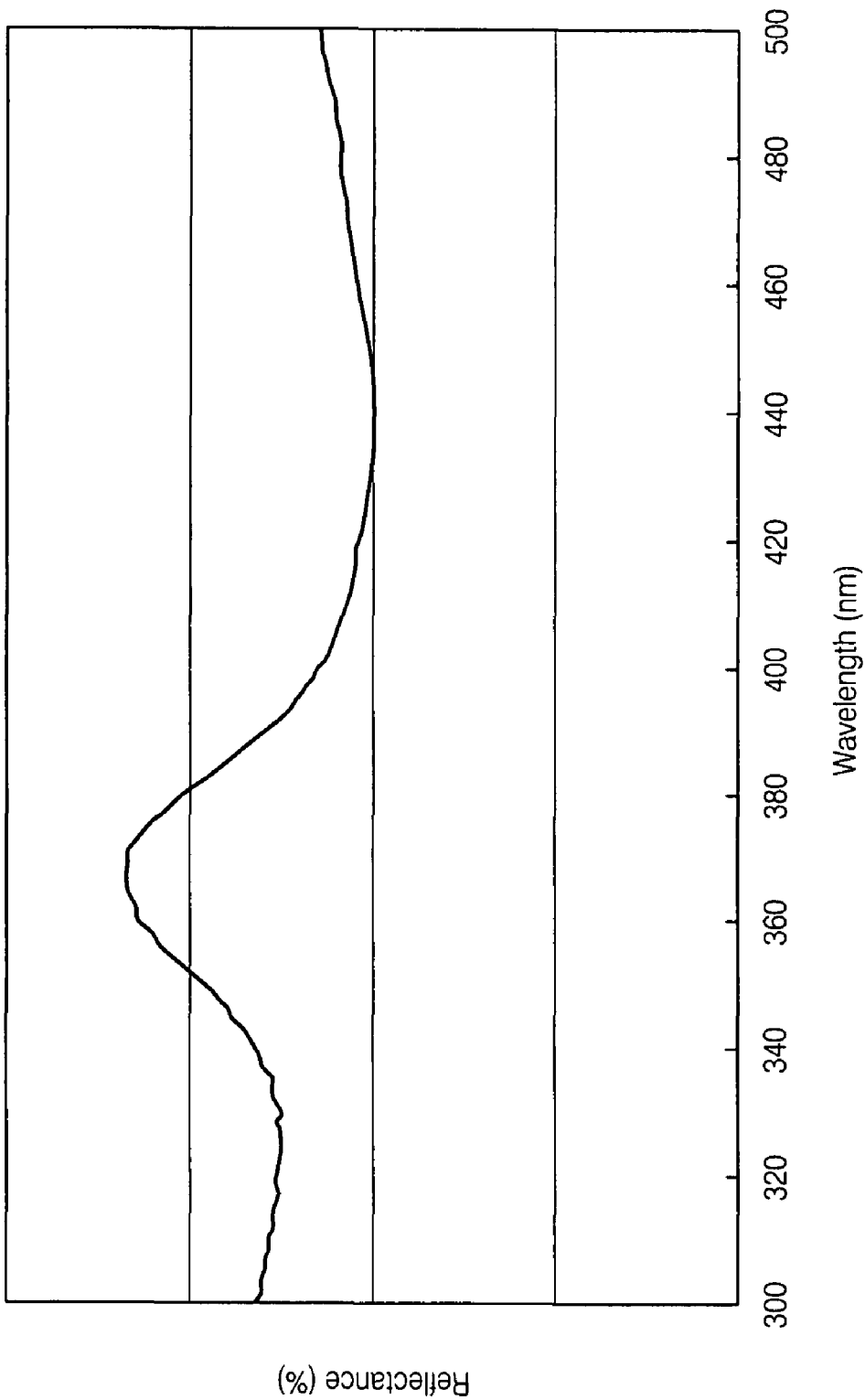
FIG. 12 shows reflection properties of the aligned metal particle film in Example B-2.

FIG. 11 shows a transmission electron microscopy (TEM) photograph of a cross section of the film thus obtained. It was found that silver was aligned in polymethacrylic acid as a layer in parallel with the substrate. FIG. 12 shows a reflection spectrum of the film. It is indicated that there is a maximum value of reflection at an irradiation wavelength of 365 nm.

Example B-3

On the reflecting substrate prepared in Example B-1 was spin-coated (1500 rpm, 10 sec) a solution prepared by dissolving 61.8 mg of silver perchlorate in 5.02 g of a 10 wt % solution of polymethacrylic acid in methanol, which was then dried at room temperature for 3 hours. Then, the film on the reflecting substrate was irradiated with vertical UV-ray at a wavelength of 436 nm for 12 hours, using a high-pressure mercury lamp (Ushio, Inc., "Multilight") and a g-line transmitting filter.

Figure 13:
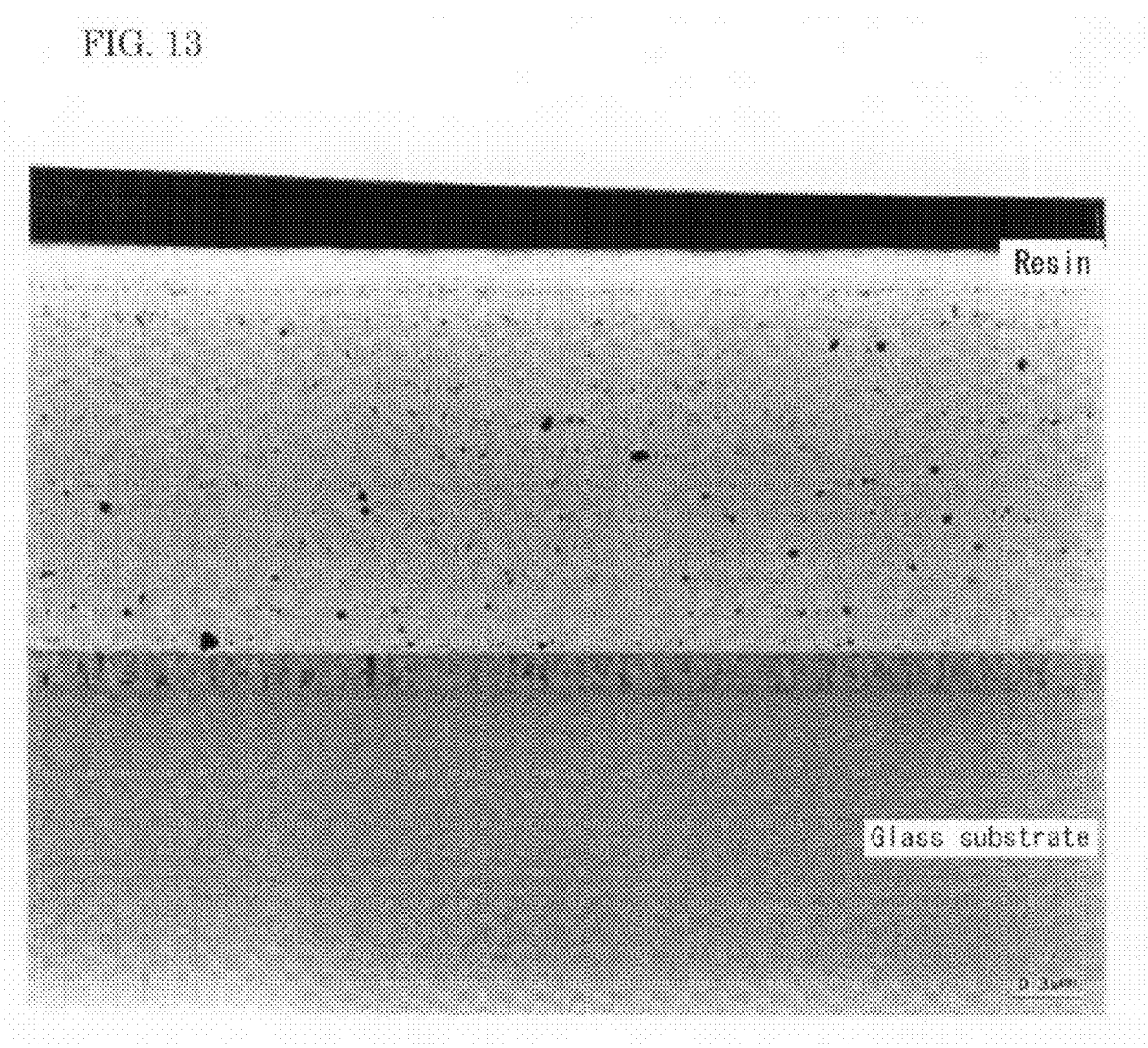
FIG. 13 shows a TEM photograph of the aligned metal particle film prepared in Example B-3, consisting of a glass substrate, an aluminum layer, a silica layer and an aligned silver-particle polymer layer in sequence from the bottom.

FIG. 13 shows a transmission electron microscopy (TEM) photograph of a cross section of the film thus obtained on the reflecting substrate. It was found that silver particles were aligned in polymethacrylic acid at an interval of about 110 nm (geometric distance) as a layer in parallel with the substrate and thus a repeating distance of metal particle layers is longer than that observed when using a wavelength of 365 nm. It was observed that majority of silver particles had a particle size of 10 nm or less.

As described above, a repeating distance (pitch) of metal particle layers can be regulated by varying a wavelength λ of irradiating light.

Reference Example B-1

Figure 14:
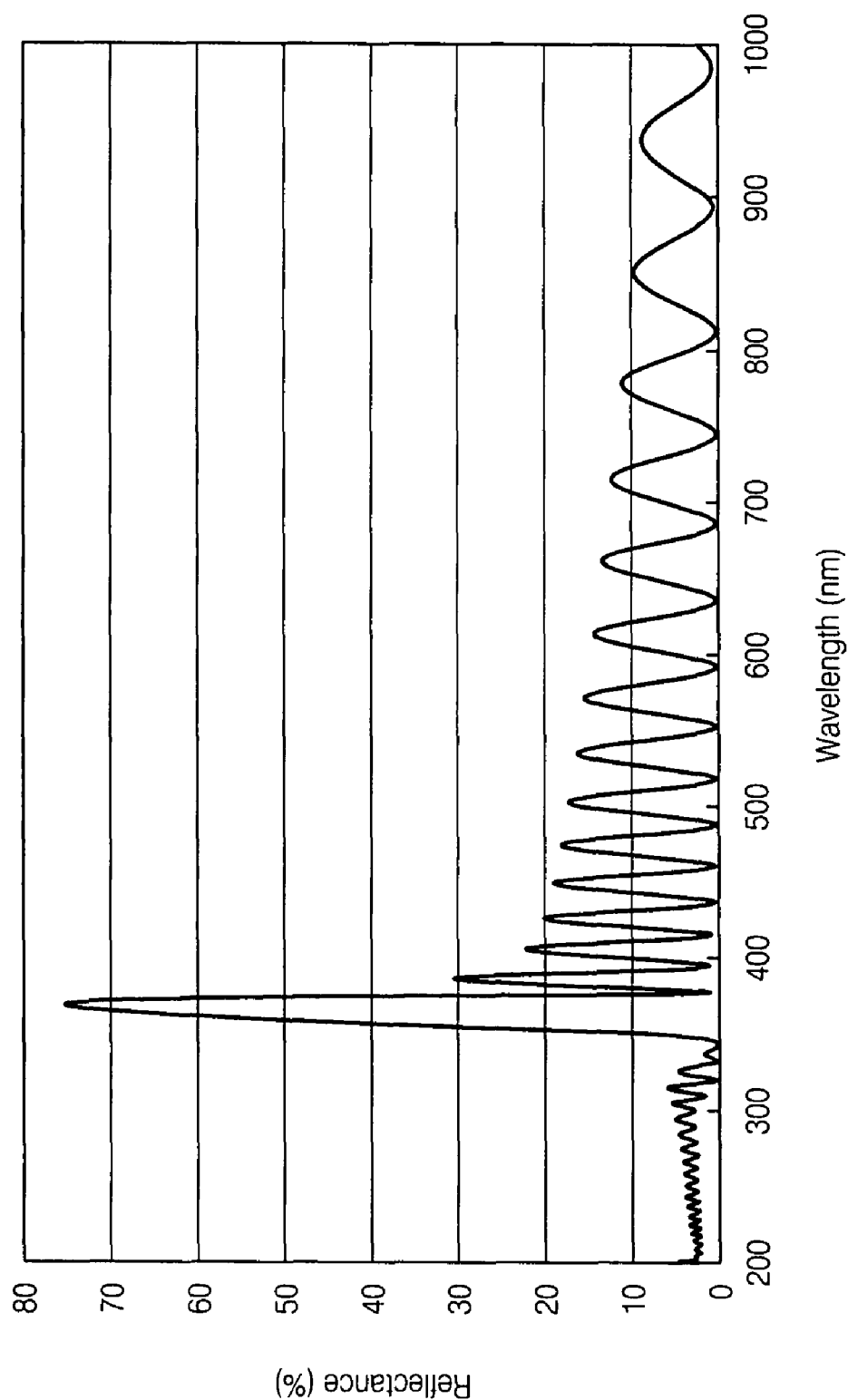
FIG. 14 shows an optical property estimation by the optical film designing software, Essential Macleod, in Reference Example B-1.

Employing physical properties corresponding to a multilayer film having 41 layers in total having a structure of 60.5 nm silica/3 nm silver/122.5 nm silica/3 nm silver/ . . . /122.5 nm silica/3 nm silver/60.5 nm silica, reflection properties were estimated by an optical film designing software, Essential Macleod. The results suggested as seen in FIG. 14 that there would be the maximum reflection wavelength at 365 nm. Here, a distance d (optical length) between metal layers meets the equation, $d=\lambda/2(\lambda=365$ nm). These results imply that by a similar principle, there also occurs reflective wavelength selectivity in the aligned metal particle film of Example B-2.

Example B-4

On the reflecting substrate prepared in Example B-1 was spin-coated (1500 rpm, 10 sec) a solution prepared by dissolving 51.5 mg of silver perchlorate in 4.99 g of a 10 wt % solution of poly(methyl methacrylate-methacrylic acid) 75:25 random copolymer in tetrahydrofuran (THF), which was then dried at room temperature for 3 hours. Then, the film on the reflecting substrate was irradiated with vertical UV-ray at a wavelength of 365 nm for 1 hour, using a high-pressure mercury lamp (Ushio, Inc., "Multilight") and a narrow-band pass filter.

Figure 15:
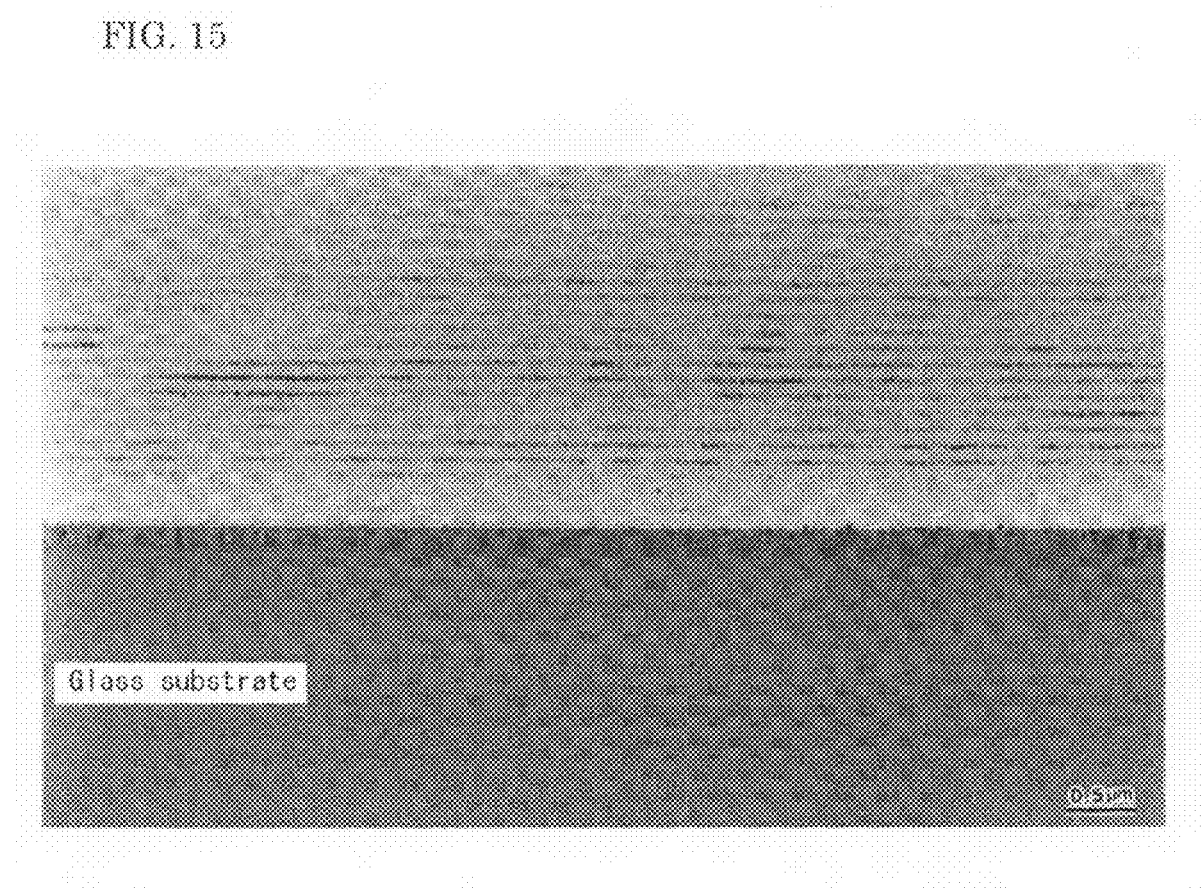
FIG. 15 shows a TEM photograph of the aligned metal particle film prepared in Example B-4, consisting of a glass substrate, an aluminum layer, a silica layer and an aligned silver-particle polymer layer in sequence from the bottom.

FIG. 15 shows a transmission electron microscopy (TEM) photograph of a cross section of the film thus obtained on the reflecting substrate. It was found that silver particles were aligned in the polymer as a layer with an interval of 108 nm (geometric distance) in parallel with the substrate. It was furthermore observed that majority of the silver particles had a particle size of 10 nm or less.

Example B-5

On the reflecting substrate prepared in Example B-1 was spin-coated (3000 rpm, 30 sec) a solution prepared by dissolving 98.0 mg of silver nitrate in 5.04 g of a 10 wt % solution of polyvinyl alcohol in water, which was then dried at room temperature for 5 hours. Then, the film on the reflecting substrate was irradiated with vertical UV-ray at a wavelength of 365 nm for 2 hours, using a high-pressure mercury lamp (Ushio, Inc., "Multilight") and a narrow-band pass filter.

Figure 16:
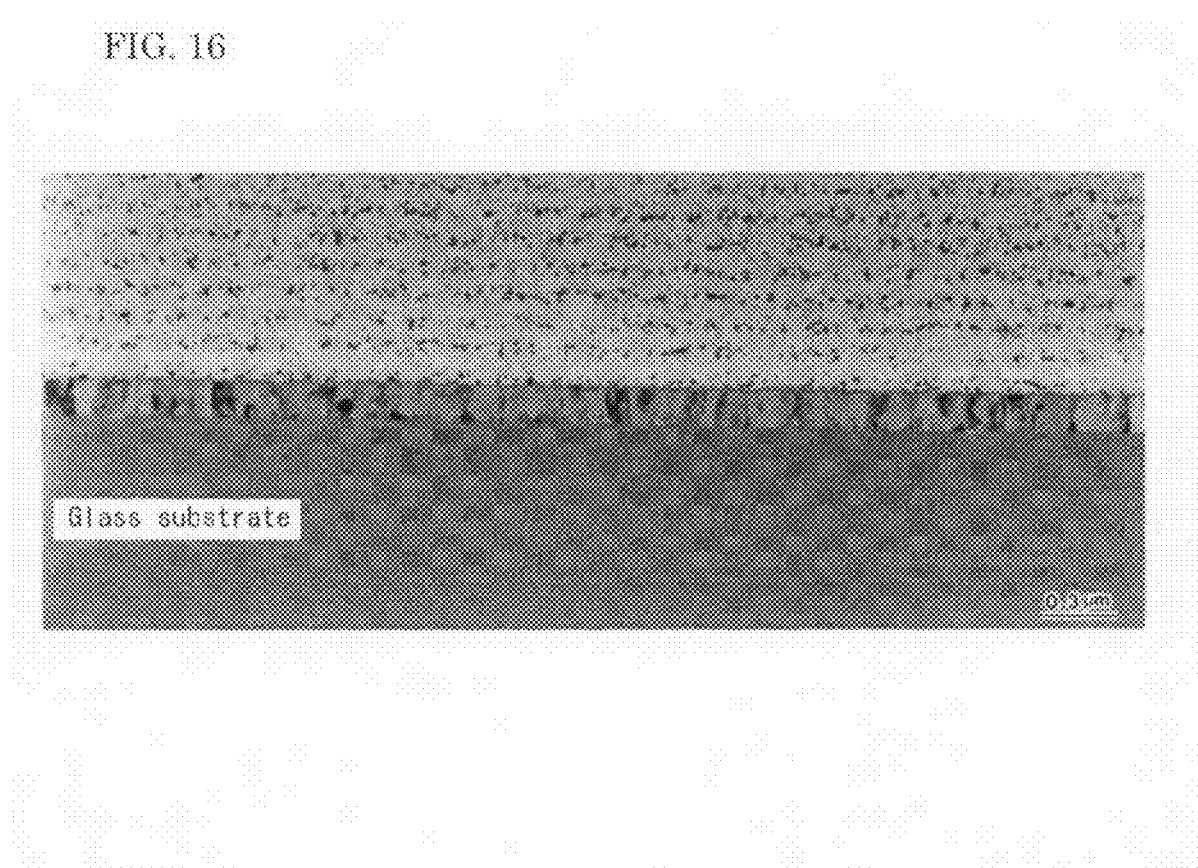
FIG. 16 shows a TEM photograph of the aligned metal particle film prepared in Example B-5, consisting of a glass substrate, an aluminum layer, a silica layer and an aligned silver-particle polymer layer in sequence from the bottom.

FIG. 16 shows a transmission electron microscopy (TEM) photograph of a cross section of the film thus obtained on the reflecting substrate. It was found that silver particles were aligned in polyvinyl alcohol as a layer with an interval of 120 nm (geometric distance) in parallel with the substrate. It was furthermore observed that majority of the silver particles had a particle size of 10 nm or less.

Example B-6

On the reflecting substrate prepared in Example B-1 was spin-coated (1500 rpm, 10 sec) a 10 wt % solution of polystyrene in toluene, which was then dried at room temperature for 3 hours. In addition, on the film on the substrate was spin-coated (1500 rpm, 10 sec) a solution prepared by adding dropwise 704 mg of a 17 wt % solution of chloroauric acid in diluted aqueous hydrochloric acid to 10.01 g of a 5 wt % solution of polyacrylic acid in methanol, which was then dried at room temperature for 3 hours. Then, the film on the reflecting substrate was irradiated with vertical UV-ray at a wavelength of 365 nm for 3 hours, using a high-pressure mercury lamp (Ushio, Inc., "Multilight") and a narrow-band pass filter. The sample thus obtained was impregnated with xylene to dissolve the styrene layer, to release an aligned metal particle film from the reflecting substrate.

Figure 17:
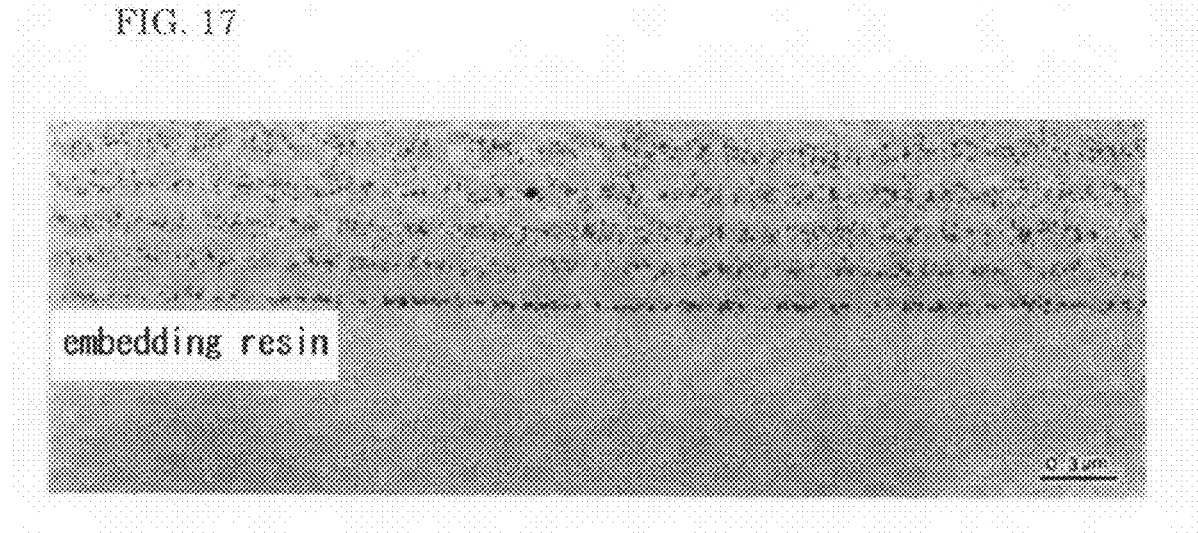
FIG. 17 shows a TEM photograph of the aligned metal particle film prepared in Example B-6, consisting of an embedding resin for preparing a sample and an aligned gold-particle polymer layer in sequence from the bottom.

FIG. 17 shows a transmission electron microscopy (TEM) photograph of a cross section of the film thus obtained. It was found that gold particles were aligned in polyacrylic acid as a layer with an interval of 130 nm (geometric distance) in parallel with the substrate. It was furthermore observed that majority of the gold particles had a particle size of about 10 nm.

Example B-7

On the reflecting substrate prepared in Example B-1 was spin-coated (1500 rpm, 10 sec) a solution prepared by dissolving 64.3 mg of silver perchlorate in 5.02 g of a 10 wt % solution of polymethacrylic acid in methanol, which was then dried at room temperature for 3 hours. Then, the film on the reflecting substrate was irradiated with UV-ray at an incident angle of 30° at a wavelength of 365 nm for 1 hour, using a high-pressure mercury lamp (Ushio, Inc., "Multilight") and a narrow-band pass filter.

Figure 18:
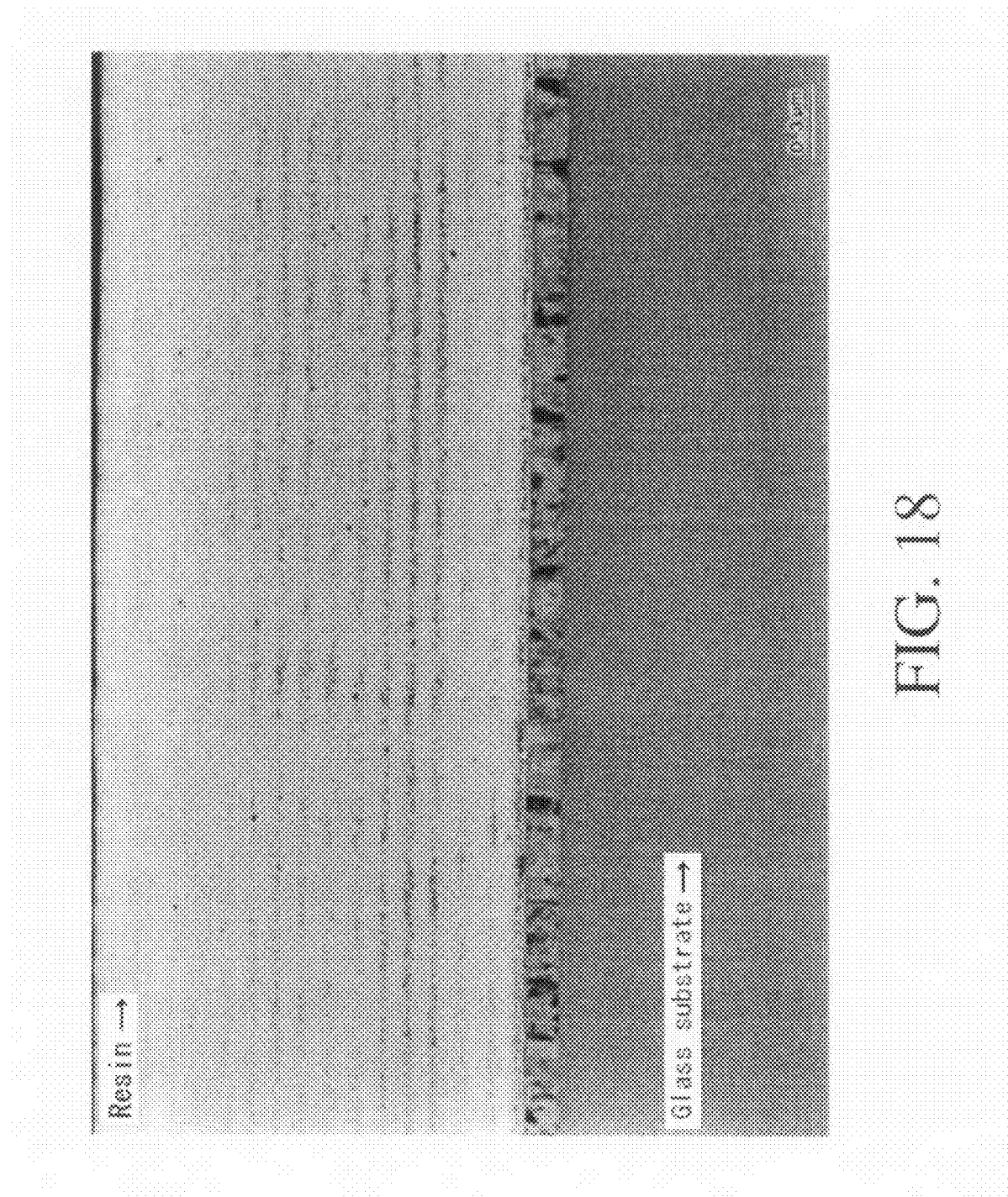
FIG. 18 shows a TEM photograph of the aligned metal particle film prepared in Example B-7, consisting of a glass substrate, an aluminum layer, a silica layer and an aligned silver-particle polymer layer in sequence from the bottom.

FIG. 18 shows a transmission electron microscopy (TEM) photograph of a cross section of the film thus obtained on the reflecting substrate. It was found that silver particles were aligned in polymethacrylic acid as a layer with an interval of 105 nm (geometric distance) in parallel with the substrate. It was furthermore observed that majority of the silver particles had a particle size of 10 nm or less.

Example B-8

On the reflecting substrate prepared in Example B-1 was spin-coated (1500 rpm, 10 sec) a solution prepared by dissolving 64.3 mg of silver perchlorate in 5.02 g of a 10 wt % solution of polymethacrylic acid in methanol, which was then dried at room temperature for 3 hours. Then, the film on the reflecting substrate was irradiated with UV-ray at an incident angle of 45° at a wavelength of 365 nm for 1 hour, using a high-pressure mercury lamp (Ushio, Inc., "Multilight") and a narrow-band pass filter.

Figure 19:
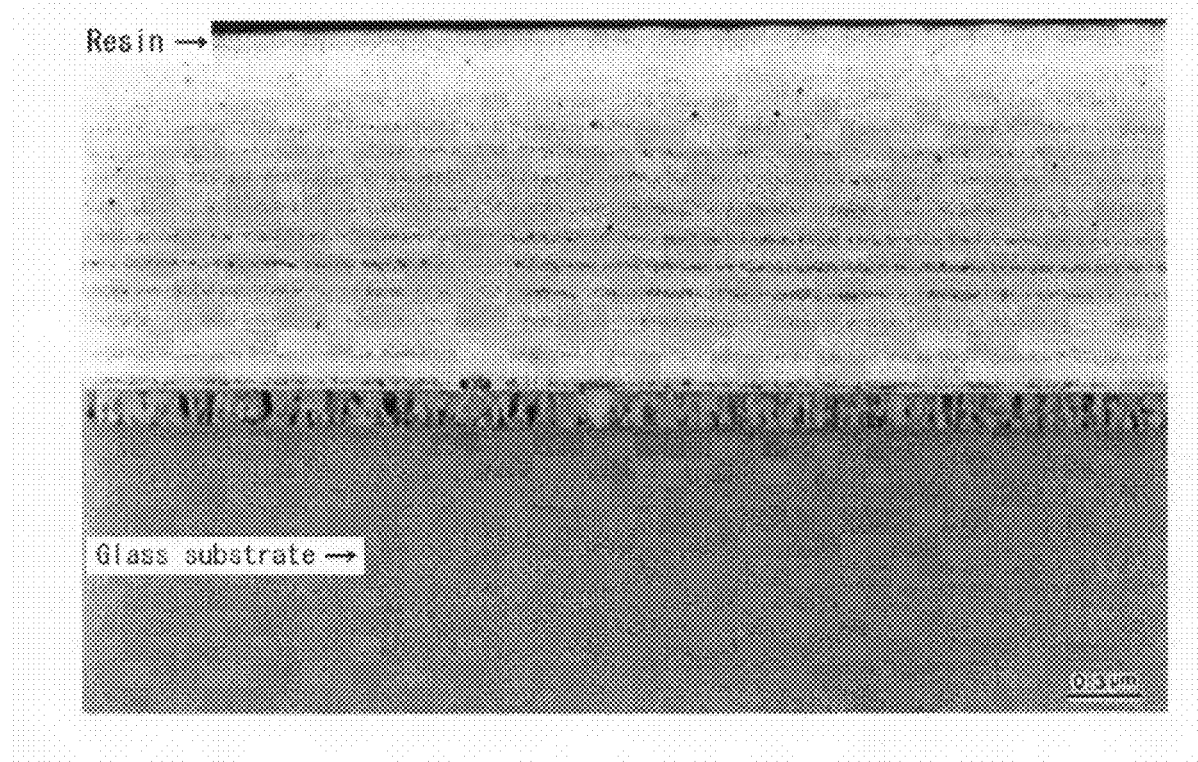
FIG. 19 shows a TEM photograph of the aligned metal particle film prepared in Example B-8, consisting of a glass substrate, an aluminum layer, a silica layer and an aligned silver-particle polymer layer in sequence from the bottom.

FIG. 19 shows a transmission electron microscopy (TEM) photograph of a cross section of the film thus obtained on the reflecting substrate. It was found that silver particles were aligned in polymethacrylic acid as a layer with an interval of 109 nm (geometric distance) in parallel with the substrate. It was furthermore observed that majority of the silver particles had a particle size of 10 nm or less.

Example B-9

On the reflecting substrate prepared in Example B-1 was spin-coated (1500 rpm, 10 sec) a solution prepared by dissolving 52.0 mg of silver perchlorate in 4.00 g of a 10 wt % solution of polymethacrylic acid in methanol, which was then dried at room temperature for 3 hours. Then, the film on the reflecting substrate was irradiated with UV-ray at an incident angle of 60° at a wavelength of 365 nm for 1 hour, using a high-pressure mercury lamp (Ushio, Inc., "Multilight") and a narrow-band pass filter.

Figure 20:
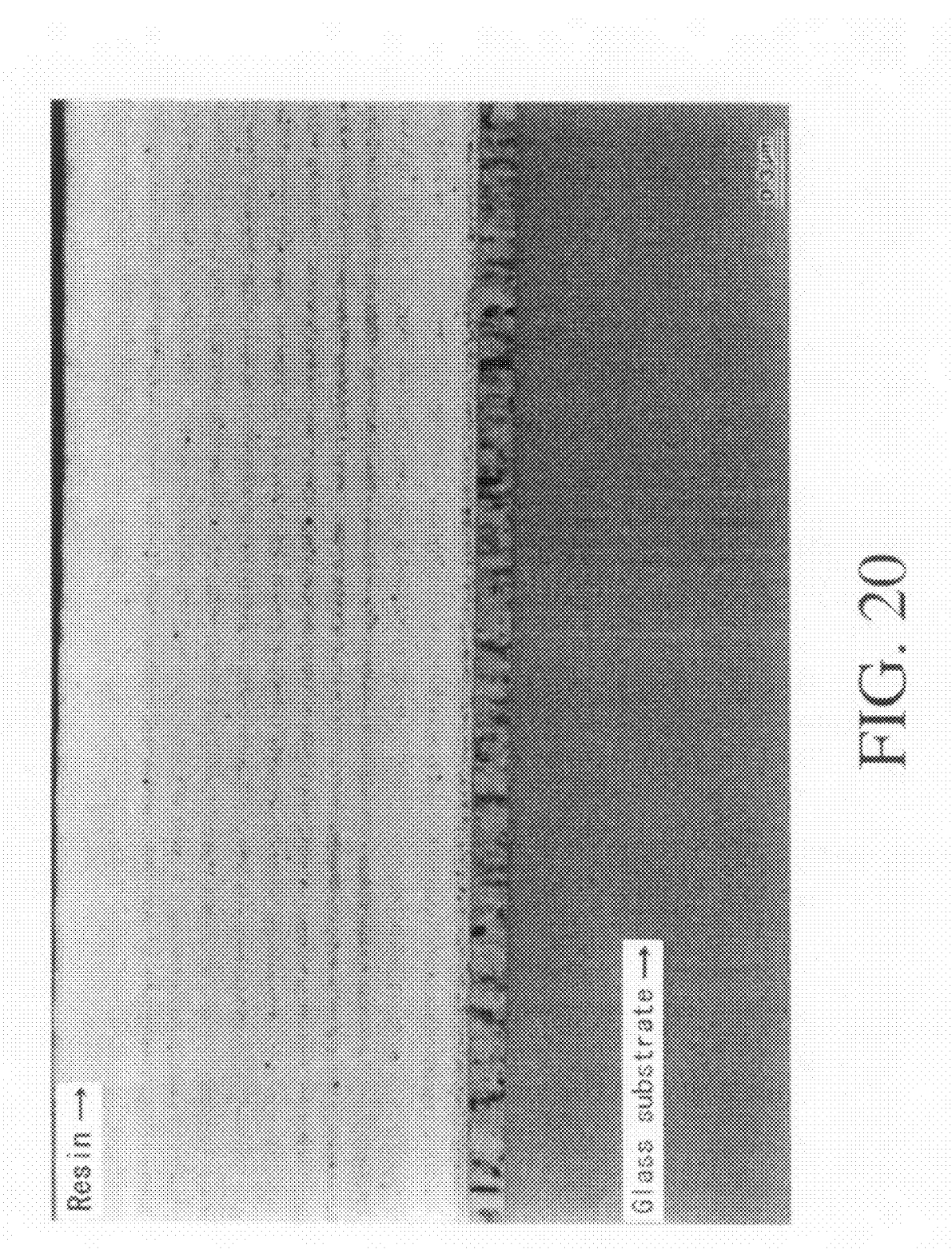
FIG. 20 shows a TEM photograph of the aligned metal particle film prepared in Example B-9, consisting of a glass substrate, an aluminum layer, a silica layer and an aligned silver-particle polymer layer in sequence from the bottom.

FIG. 20 shows a transmission electron microscopy (TEM) photograph of a cross section of the film thus obtained on the reflecting substrate. It was found that silver particles were aligned in polymethacrylic acid as a layer with an interval of 122 nm (geometric distance) in parallel with the substrate. It was furthermore observed that majority of the silver particles had a particle size of 10 nm or less.

As described above, repeating distance of metal particle layers can be increased by increasing incident angle of an irradiating light. In other words, when alignment is conducted at an equal wavelength λ, an incident angle of an irradiating light can be varied to regulate an optical path difference between an incident light and a reflected light and thus to regulate a repeating distance (pitch) of metal particle layers.

Reference Example B-2

Figure 21:
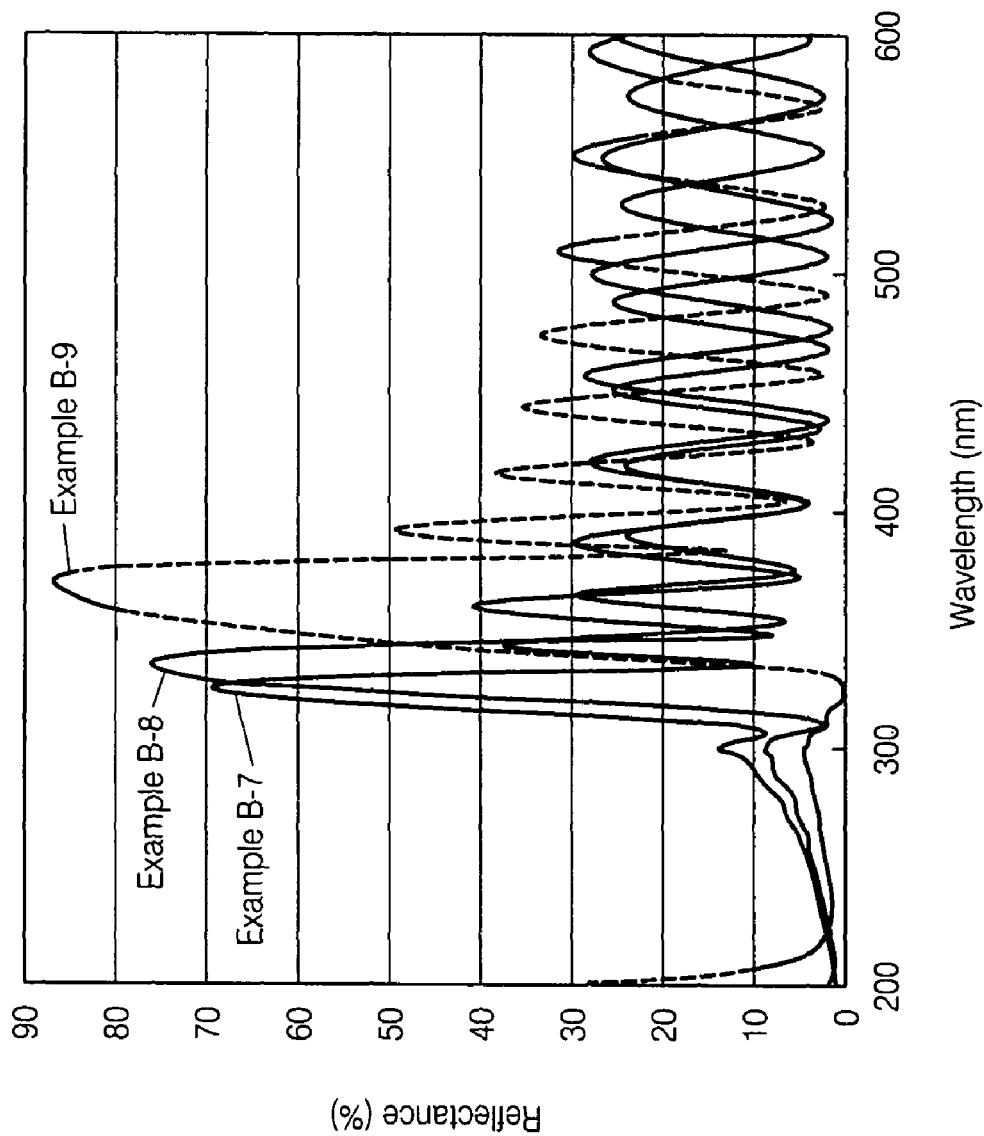
FIG. 21 shows an optical property estimation by the optical film designing software, Essential Macleod, in Reference Example B-2.

Based on the TEM photograph in Example B-7 (incident angle: 30°) and employing physical properties corresponding to a multilayer film having 28 layers in total having a structure of 100.0 nm polymethacrylic acid/10 nm silver/95.0 nm polymethacrylic acid/10 nm silver/ . . . /100.0 nm polymethacrylic acid/10 nm silver, reflection properties were estimated by an optical film designing software, Essential Macleod. The results suggested as seen in FIG. 21 that there would be the maximum reflection wavelength at 326 nm. A refractive index of the polymer at 326 nm is about 1.55 as determined by spectroscopic ellipsometry, and a distance d (optical length) between metal layers, therefore, meets the equation, $d=nd'=\lambda/2$ ($\lambda=326$ nm, geometric distance $d'=105$ nm). Likewise, FIG. 21 shows the expected reflection property results based on the TEM photographs in Examples 8 (incident angle: 45°) and 9 (incident angle: 60°) together. It was found that in Examples 8 and 9, the above relational equation was met and an incident angle could be varied to regulate the maximum reflection wavelength. That is, it can be speculated that an angle of an irradiating light can be varied to regulate a repeating distance (pitch) of metal particle layers and to alter reflection wavelength selectivity.

Reference Example B-3

Figure 22:
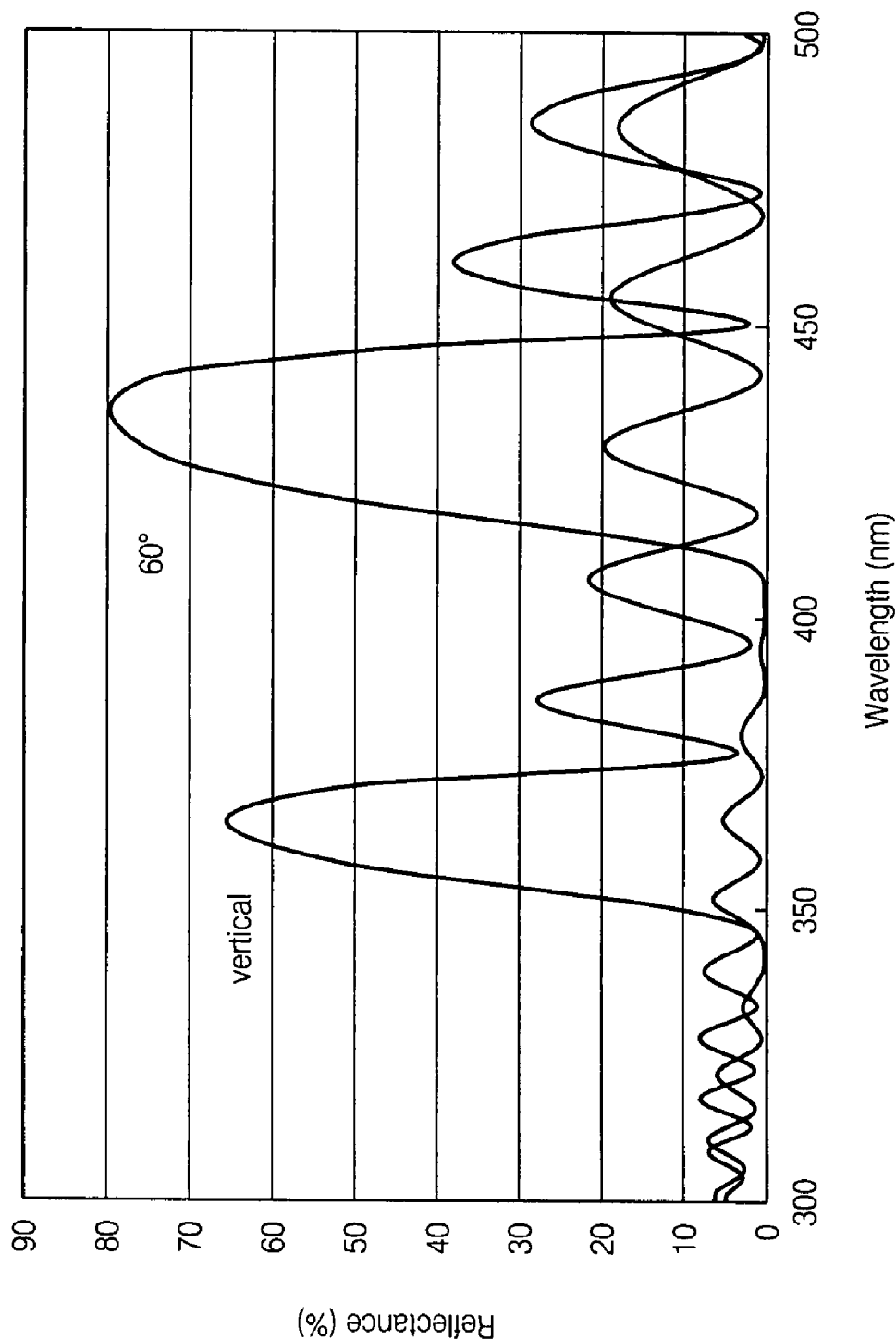
FIG. 22 shows an optical property estimation by the optical film designing software, Essential Macleod, in Reference Example B-3.

In accordance with the interference theory described using FIG. 27A, it is possible to infer the structure of an aligned metal particle film when light at λ=365 nm is vertically irradiated, and employing physical properties corresponding to a multilayer film consisting of 38 layers in total having the structure of 116.0 nm polymethacrylic acid/3 nm silver/116.0 nm polymethacrylic acid/3 nm silver/ . . . /116.0 nm polymethacrylic acid/3 nm silver, reflection properties were estimated by an optical film designing software, Essential Macleod. The results are shown in FIG. 22.

Likewise, it is possible to infer the structure of an aligned metal particle film when light at λ=365 nm is irradiated at an angle of 60°, and employing physical properties corresponding to a multilayer film consisting of 38 layers in total having the structure of 141.0 nm polymethacrylic acid/3 nm silver/141.0 nm polymethacrylic acid/3 nm silver/ . . . /141.0 nm polymethacrylic acid/3 nm silver, reflection properties were estimated by an optical film designing software, Essential Macleod. The results are shown in FIG. 22.

Example B-10

On the reflecting substrate prepared in Example B-1 was spin-coated (1500 rpm, 10 sec) a solution prepared by dissolving 50.1 mg of silver perchlorate in 5.00 g of a 10 wt % solution of poly(methyl methacrylate-methacrylic acid) 75:25 random copolymer in tetrahydrofuran (THF), which was then dried at room temperature for 3 hours. Then, the film on the reflecting substrate was irradiated with vertical UV-ray at a wavelength of 365 nm for 2 hours, using a high-pressure mercury lamp (Ushio, Inc., "Multilight") and a narrow-band pass filter. From the reflecting substrate of the sample thus obtained was released an aligned metal particle film, which was then sandwiched by two quartz plates to prepare an optical element.

Figure 23:
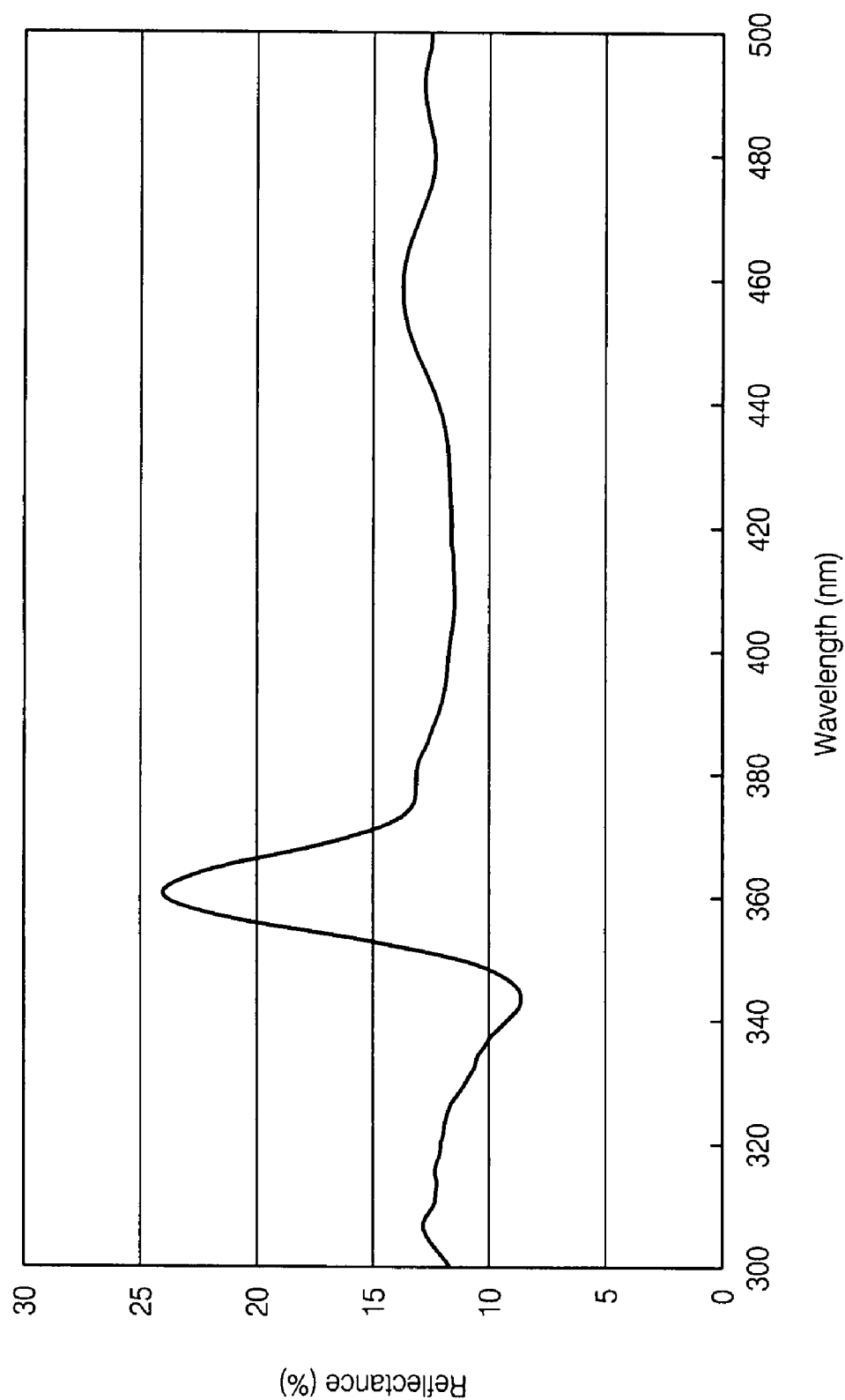
FIG. 23 shows reflection properties for the optical element prepared by sandwiching one aligned metal particle film between quartz plates in Example B-10.

FIG. 23 shows a reflection spectrum of the optical element thus prepared. Substantially as expected in accordance with the interference theory described in Reference Example B-3, it was found that there was the reflection maximum of 24.1% at 360 nm which was very close to the irradiating wavelength.

Figure 24:
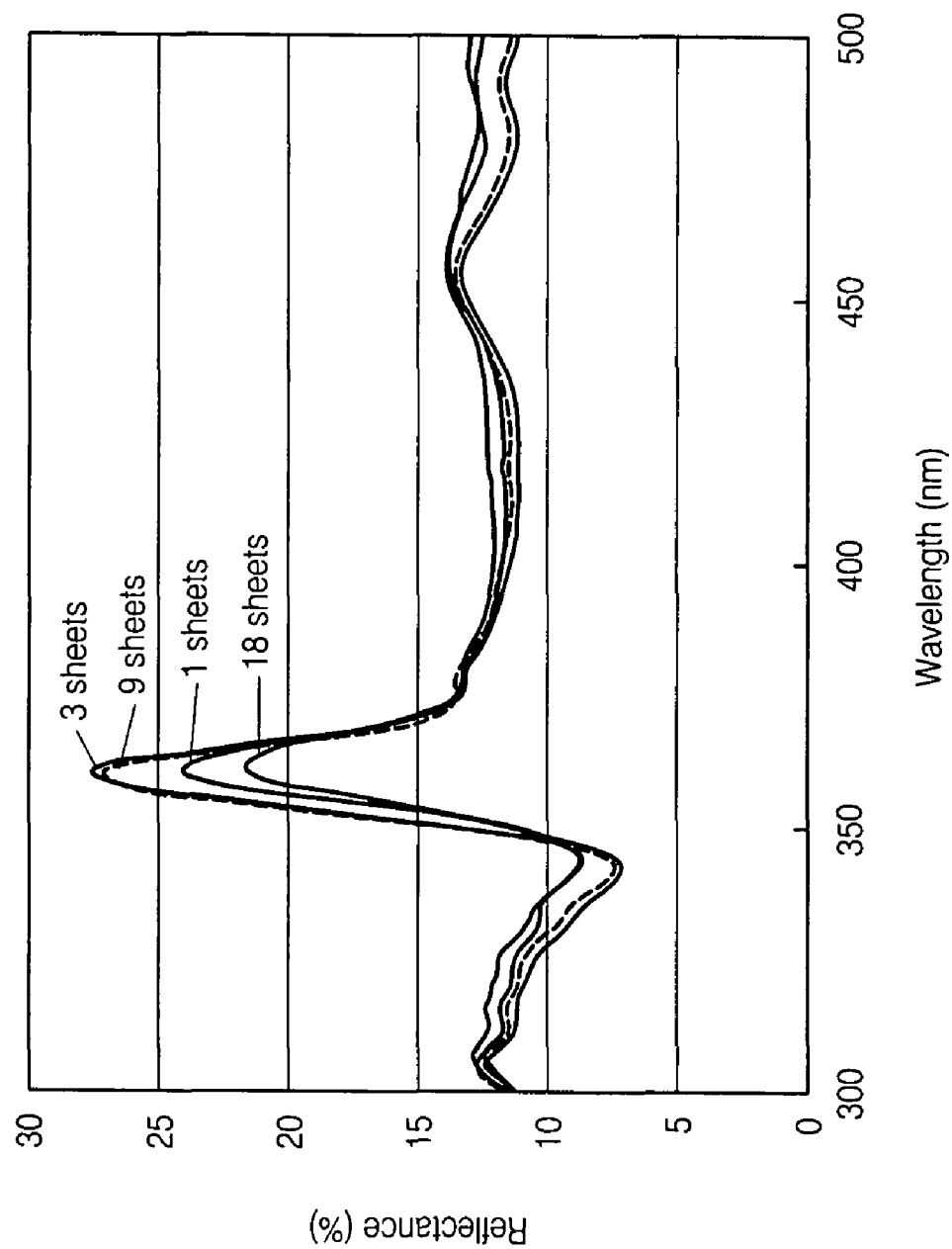
FIG. 24 shows reflection properties for an optical element prepared by sandwiching a given number of the aligned metal particle films in Example B-10.

Furthermore, FIG. 24 shows a reflection spectrum for an optical element prepared by forming a plurality of aligned metal particle films as described above and laminating a given sheets of these films, which was then sandwiched between quartz plates. It is found that a reflection maximum is higher in a three- or nine-sheet laminate than one sheet (three sheets; 27.6%, nine sheets; 27.1%). Thus, reflection properties can be improved by laminating a plurality of aligned metal particle films.

Example B-11

On the reflecting substrate prepared in Example B-1 was spin-coated (1500 rpm, 10 sec) a solution prepared by dissolving 50.1 mg of silver perchlorate in 5.00 g of a 10 wt % solution of poly(methyl methacrylate-methacrylic acid) 75:25 random copolymer in tetrahydrofuran (THF), which was then dried at room temperature for 3 hours. Then, the film on the reflecting substrate was irradiated with UV-ray at an incident angle of 60° at a wavelength of 365 nm for 3 hours, using a high-pressure mercury lamp (Ushio, Inc., "Multilight") and a narrow-band pass filter. From the reflecting substrate of the sample thus obtained was released an aligned metal particle film, which was then sandwiched by two quartz plates to prepare an optical element.

Figure 25:
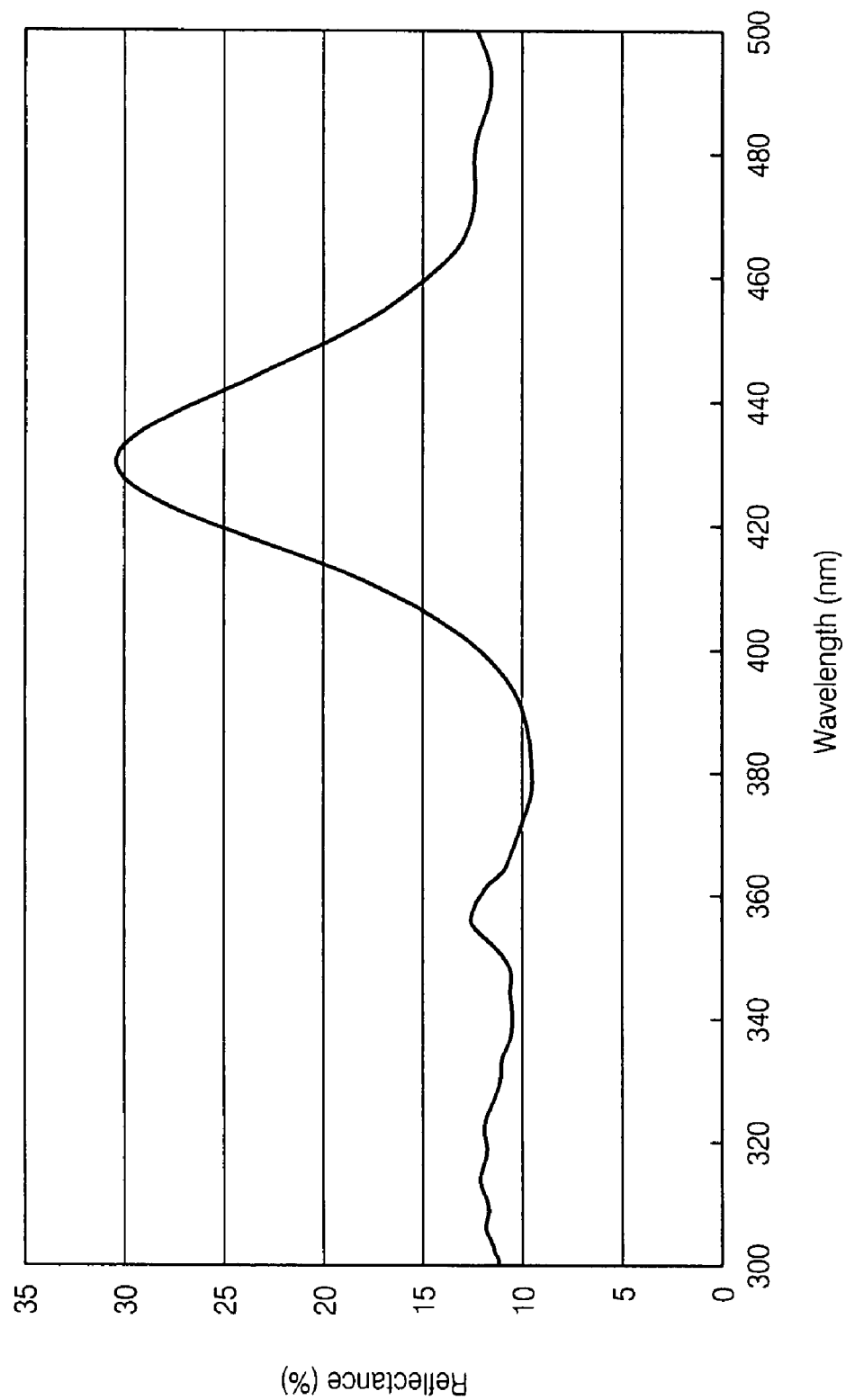
FIG. 25 shows reflection properties of the aligned metal particle film in Example B-11.

FIG. 25 shows a reflection spectrum for the optical element prepared. As seen from the figure, a wavelength of the reflection maximum shifts to 430 nm, and the reflection maximum value is 30.5%. It is thus confirmed that an angle of an irradiating light can be varied to regulate a repeating distance (pitch) of metal particle layers and to alter reflection wavelength selectivity substantially as expected in accordance with the interference theory described in Reference Example B-3.

What is claimed is:

1. A process for manufacturing an aligned metal particle film, comprising:
   Step (A) of forming a polymer film containing a metal component on a reflecting substrate; and
   Step (B) of irradiating the polymer film with light at a particular wavelength having a half width of 20 nm or less, thereby forming the aligned metal particle film having a multilayer structure in which dense metal-particle layers are periodically aligned in a thickness direction of the polymer film.

2. The manufacturing process as claimed in claim 1, comprising:
   before Step (A), forming a release layer transmitting light at a wavelength used in the subsequent Step (B) on the reflecting substance;

in Step (A), forming a polymer film containing a metal component on the release layer; and after Step (B), releasing the light-irradiated polymer film from the reflecting substrate.

3. The process as claimed in claim 2, wherein the step of releasing the reflecting substrate from the polymer film comprises the step of removing the release layer.

4. The process as claimed in claim 3, wherein the removing of the release layer is conducted by dissolving the release layer.

5. The process as claimed in claim 1, wherein the metal component comprise a metal compound which is reduced by light at the particular wavelength to generate metal particles.

6. The process as claimed in claim 5, wherein the metal compound is at least one selected from the group consisting of silver perchlorate, silver nitrate and chloroauric acid.

7. The manufacturing process as claimed in claim 1, wherein Step (A) of forming the polymer film comprises the sub-steps of:

forming a film with use of a polymer solution containing a metal component on the reflecting substrate; and evaporating a solvent.

8. The process as claimed in claim 1, wherein the metal component comprises metal particles.

9. The process as claimed in claim 1, wherein the polymer constituting the polymer film is transparent at least at the particular wavelength.

10. The process as claimed in claim 1, wherein the polymer is at least one selected from the group consisting of polymethacrylic acid, polyacrylic acid, a copolymer comprising a methacrylic or acrylic monomer unit and polyvinyl alcohol.

11. The process as claimed in claim 1, wherein in Step (B), a wavelength of the irradiating light is varied to adjust a repeating distance of the metal particle layers in the aligned metal particle film.

12. The process as claimed in claim 1, wherein in Step (B), an angle of the irradiating light to the reflecting substrate is varied to adjust a repeating distance of the metal particle layers in the aligned metal particle film.

13. A process for manufacturing a multilayer laminate including aligned metal particle films, said process comprising steps of manufacturing aligned metal particle film by a process according to claim 1, and laminating plurality of the aligned metal particle films.

* * * * *